United States Patent
Park et al.

(10) Patent No.: US 11,626,041 B2
(45) Date of Patent: Apr. 11, 2023

(54) DISPLAY DEVICE

(71) Applicant: LG Display Co., Ltd., Seoul (KR)

(72) Inventors: GeunChang Park, Goyang-si (KR); ChounSung Kang, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/507,335

(22) Filed: Oct. 21, 2021

(65) Prior Publication Data

US 2022/0130288 A1    Apr. 28, 2022

(30) Foreign Application Priority Data

Oct. 27, 2020 (KR) .................. 10-2020-0140543

(51) Int. Cl.
    *G09F 9/30*  (2006.01)
    *G06F 1/16*  (2006.01)
(52) U.S. Cl.
    CPC ............ *G09F 9/301* (2013.01); *G06F 1/1652* (2013.01); *G06F 1/1681* (2013.01)
(58) Field of Classification Search
    CPC combination set(s) only.
    See application file for complete search history.

(56) References Cited

U.S. PATENT DOCUMENTS

| | | | | |
|---|---|---|---|---|
| 9,756,757 B2* | 9/2017 | Park | .................. | H05K 7/16 |
| 9,760,975 B2* | 9/2017 | Kim | .................. | G09F 9/00 |
| 9,864,412 B2* | 1/2018 | Park | .................. | G06F 1/1652 |
| 10,362,690 B2* | 7/2019 | Han | .................. | G09F 9/301 |
| 10,782,740 B2* | 9/2020 | Kim | .................. | H05K 5/0017 |
| 11,087,648 B2* | 8/2021 | Lee | .................. | H05K 5/0017 |
| 11,089,700 B2* | 8/2021 | Kang | .................. | G06F 1/1652 |
| 11,199,877 B2* | 12/2021 | Kim | .................. | H05K 5/0017 |
| 11,234,337 B2 | 1/2022 | Song et al. | | |
| 11,256,295 B2 | 2/2022 | Lee et al. | | |
| 11,270,606 B2 | 3/2022 | Kwon et al. | | |
| 11,443,660 B2 | 9/2022 | Pyo | | |
| 11,452,245 B2* | 9/2022 | Song | .................. | G09G 3/20 |
| 11,455,913 B2* | 9/2022 | Kwon | .................. | H01L 51/5246 |
| 11,468,801 B2* | 10/2022 | Oh | .................. | H01L 51/5293 |
| 2016/0363960 A1* | 12/2016 | Park | .................. | G09F 15/0062 |
| 2017/0161868 A1* | 6/2017 | Kim | .................. | G09F 9/301 |
| 2019/0037710 A1* | 1/2019 | Han | .................. | G09F 9/301 |
| 2019/0324501 A1* | 10/2019 | Kim | .................. | G06F 1/1601 |

(Continued)

FOREIGN PATENT DOCUMENTS

| | | |
|---|---|---|
| JP | 2016-130853 A | 7/2016 |
| JP | 2017-198970 A | 11/2017 |

(Continued)

*Primary Examiner* — Lisa Lea-Edmonds
(74) *Attorney, Agent, or Firm* — Seed IP Law Group LLP

(57) ABSTRACT

A display device includes a display panel including a display area where images are displayed, a first cover configured to support a rear surface of the display panel, a roller configured to wind or unwind the display panel and the first cover, a second cover with a first end of the second cover fixed to the roller and a second opposite end of the second cover connected to an end of the first cover, and a cover assembly connecting the first cover and the second cover, wherein a boundary of the display area overlaps the cover assembly, and the cover assembly is configured to expose the display area.

20 Claims, 34 Drawing Sheets

(56) References Cited

U.S. PATENT DOCUMENTS

| | | | |
|---|---|---|---|
| 2020/0205301 A1* | 6/2020 | Song | H05K 7/20963 |
| 2021/0007230 A1 | 1/2021 | Kang et al. | |
| 2021/0012688 A1* | 1/2021 | Lee | G09G 3/00 |
| 2021/0074189 A1 | 3/2021 | Kwon et al. | |
| 2021/0090476 A1 | 3/2021 | Kang et al. | |
| 2021/0142698 A1* | 5/2021 | Oh | G09F 9/301 |
| 2021/0272484 A1 | 9/2021 | Pyo | |
| 2022/0069249 A1 | 3/2022 | Kim | |
| 2022/0130288 A1* | 4/2022 | Park | G06F 1/1652 |
| 2022/0139275 A1* | 5/2022 | Pyo | G09F 9/301 |
| | | | 361/679.01 |

FOREIGN PATENT DOCUMENTS

| | | |
|---|---|---|
| JP | 2018-168611 A | 11/2018 |
| JP | 2020-076986 A | 5/2020 |
| JP | 10-2020-0079855 A | 7/2020 |
| KR | 10-2020-0031947 A | 3/2020 |
| KR | 10-2020-0056636 A | 5/2020 |
| KR | 10-2021-0020726 A | 2/2021 |

* cited by examiner

DISPLAY DEVICE

CROSS-REFERENCE TO RELATED APPLICATIONS

This application claims priority to Korean Patent Application No. 10-2020-0140543 filed on Oct. 27, 2020, in the Korean Intellectual Property Office, the entire disclosure of which is incorporated herein by reference.

BACKGROUND

Technical Field

The present disclosure relates to a display device, and more particularly, to a rollable display device which may display an image even when rolled up.

Description of the Related Art

Display devices employed by the monitor of a computer, a TV, a mobile phone or the like include an organic light emitting display (OLED) that emits light by itself, a liquid crystal display (LCD) that requires a separate light source, and the like.

As display devices have been increasingly applied to diverse fields such as a computer monitor, a TV, and a personal mobile device, display devices having a large display area and a reduced volume and weight have been studied.

Further, recently, a rollable display device which may be flexible and configured to display an image even when rolled up has attracted attention as a next-generation display device.

BRIEF SUMMARY

A display device according to the present disclosure is capable of suppressing shielding of a display area of a display panel by a cover part when the display panel is fully unwound.

A display device according to the present disclosure is also capable of suppressing the occurrence of wrinkles in a display panel. This may be achieved by using a top cover including a hinge structure to expose a display area of the display panel when the display panel is unwound and forming a circular shape with a roller and a cover part when the display panel is wound.

A display device according to the present disclosure is further capable of suppressing opening of a top cover at unnecessary positions.

A display device according to the present disclosure is also capable of suppressing the generation of noise during opening and closing operations of a top cover.

A display device according to the present disclosure is further capable of guiding stable opening and closing operations of a top cover when a display panel is wound or unwound.

According to the present disclosure, it is possible to suppress shielding of a display area of a display panel by a cover part when the display panel is fully unwound.

According to the present disclosure, it is possible to form a circular shape with a cover part and a roller when the display panel is wound and thus possible to minimize the occurrence of wrinkles in the display panel.

According to the present disclosure, it is possible to minimize noise caused by opening and closing of a top cover when the display panel is unwound.

According to the present disclosure, it is possible to stably open and close the top cover when the display panel is wound or unwound.

The benefits and advantages of the present disclosure are not limited to the above non-limiting examples, and other benefits and advantages, which are not mentioned above, can be clearly understood by those skilled in the art from the following description.

In an embodiment, the display device may be a flexible display device including a display, lines, etc. formed on a flexible substrate made of flexible plastic.

In an embodiment, the display device includes a display panel including a display area where images are displayed. The display device also includes a first cover configured to support a rear surface of the display panel and a roller configured to wind or unwind the display panel and the first cover. The display device further includes a second cover whose one end is fixed to the roller and the other end is connected to one end of the first cover and a cover part connecting the first cover and the second cover. A boundary of the display area overlaps the cover part, and the cover part is configured to expose the display area.

In an embodiment, the display device includes a display panel including a display area and a non-display area. The display device also includes a first cover attached to the display panel and a roller configured to wind or unwind the display panel. The display device further includes a second cover connecting the first cover and the roller and a cover part which connects one end of the first cover and one end of the second cover and in which the non-display area is inserted. A part of the display area is configured to be disposed on the cover part, and the cover part is configured to selectively expose the part of the display area configured to be disposed on the cover part.

Other detailed matters of the embodiments of the disclosure are included in the detailed description with reference to the enclosed drawings.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
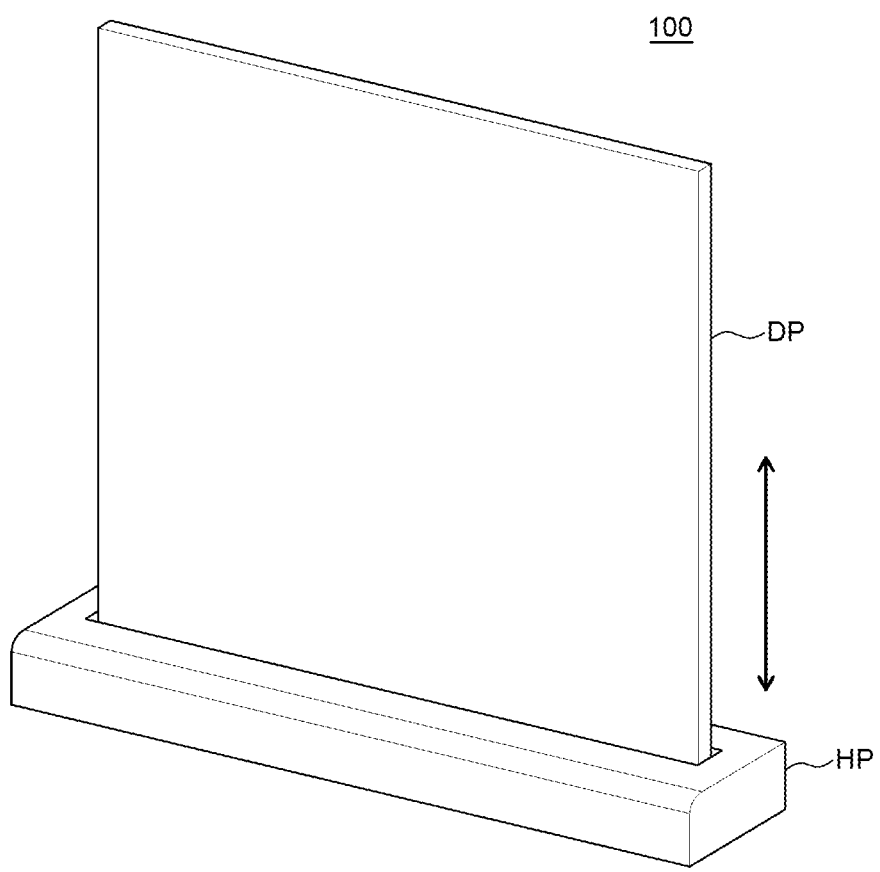
FIG. 1A and FIG. 1B are front perspective views of a display device according to an embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is referred to as being "on" another element or layer, it may be directly on the other element or layer, or intervening elements or layers may be present.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since the dimensions and thickness of each component illustrated in the drawings are represented for convenience in explanation, the present disclosure is not necessarily limited to the illustrated dimensions and thickness of each component.

The features of various embodiments of the present disclosure may be partially or entirely coupled to or combined with each other and may be interlocked and operated in technically various ways, and the embodiments may be carried out independently of or in association with each other.

Hereinafter, various embodiments of the present disclosure will be described in detail with reference to the accompanying drawings.

Display Device-Rollable Display Device

A rollable display device may refer to a display device which may display an image even when rolled up, or in both a rolled and unrolled configuration. The rollable display device may have higher flexibility than conventional typical display devices. The rollable display device may be freely changed in shape depending on whether the rollable display device is in use or not. Specifically, when the rollable display device is not in use, the rollable display device may be in the rolled configuration to reduce its volume. On the contrary, when the rollable display device is in use, the rolled display device may be unrolled to increase the viewing area.

Figure 1B:
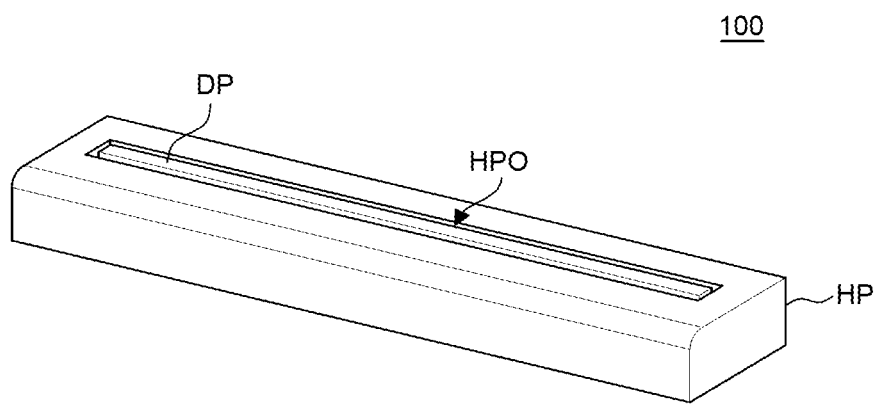

FIG. 1A and FIG. 1B are perspective views of a display device according to an embodiment of the present disclosure. Referring to FIG. 1A and FIG. 1B, the display device according to an embodiment of the present disclosure includes a display part DP (which may also be referred to herein as a display DP or a display assembly DP) and a housing part HP (which may also be referred to herein as a housing HP).

The display part DP is configured to display images to a user. For example, display elements, circuits for driving the display elements, lines, and other components may be disposed in the display part DP. The display device 100 is a rollable display device 100 according to one embodiment of the present disclosure. Therefore, the display part DP may be configured to be wound and unwound. For example, the display part DP may include a display panel 120 and a first cover 110a (FIG. 4B) which are flexible so as to be wound or unwound. More details of the display part DP will be described later with reference to FIG. 4A through FIG. 5C.

The housing part HP serves as a case where the display part DP may be accommodated, and in particular in the rolled or storage configuration. The housing part HP may also accommodate other features of the display device 100, as described herein. The housing part HP includes an opening HPO through which the display part DP may move in and out of the housing part HP.

Meanwhile, the display part DP of the display device 100 may transition from a fully unwound state as shown in FIG. 1A to a fully wound state as shown in FIG. 1B, and vice versa.

The display device 100 also includes a driving part MP (which may also be referred to herein as a driving assembly MP) for winding or unwinding the display part DP to change the display part DP to the fully unwound state or the fully wound state, as further explained below.

Driving Part

Figure 2:
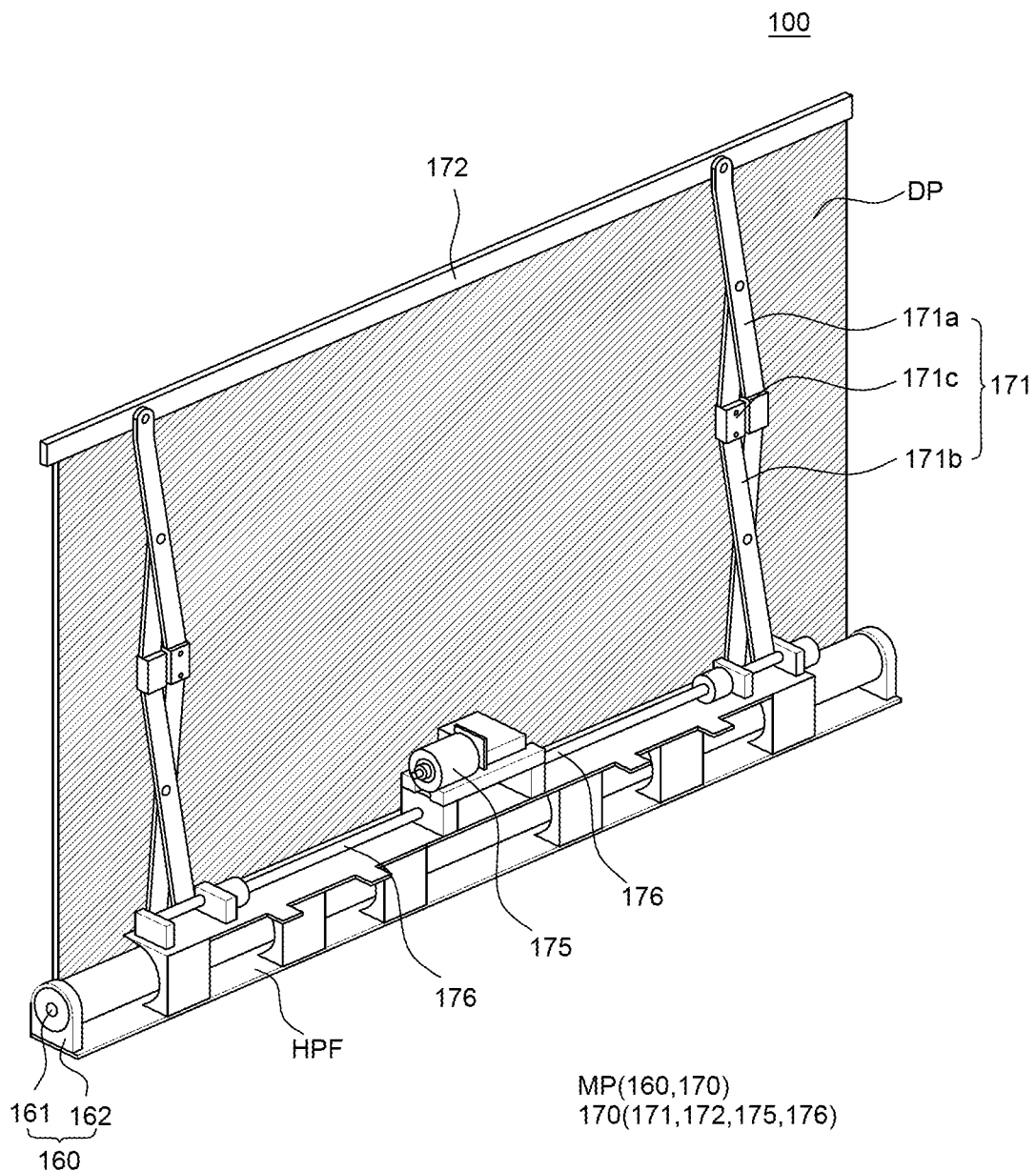
FIG. 2 is a rear perspective view of the display device of FIG. 1A according to an embodiment of the present disclosure.
Figure 3:
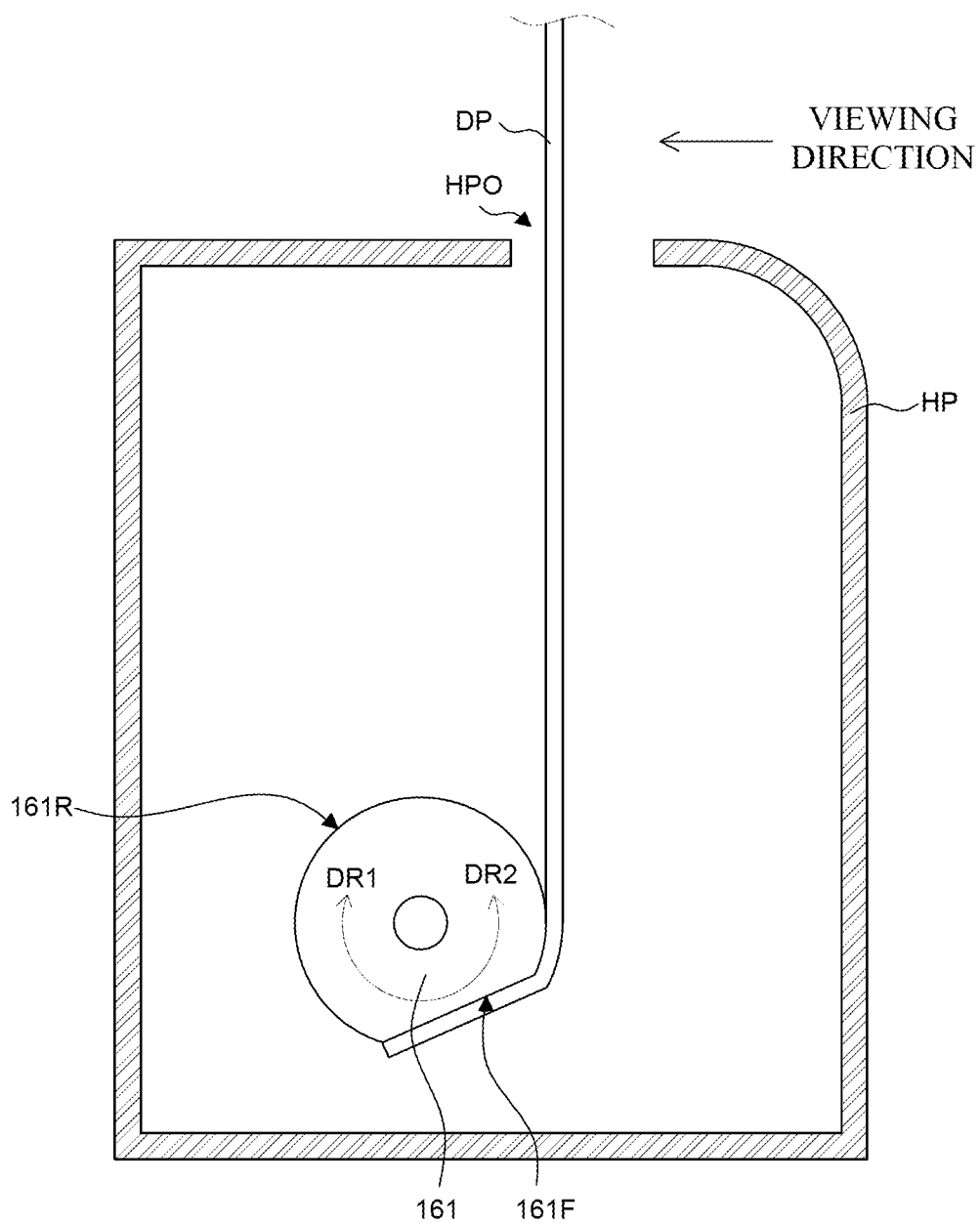
FIG. 3 is a schematic cross-sectional view of the display device of FIG. 1A according to an embodiment of the present disclosure.

FIG. 2 is a perspective view of the display device 100 according to an embodiment of the present disclosure. FIG. 3 is a schematic cross-sectional view of the display device 100 according to an embodiment of the present disclosure. In particular, FIG. 3 illustrates a roller 161 coupled to the display part DP of the display device 100 according to an embodiment of the present disclosure. For the convenience of description, FIG. 3 illustrates only the housing part HP, the roller 161, and the display part DP.

First, referring to FIG. 2, the driving part MP includes a roller unit 160 (which may also be referred to herein as a roller assembly 160) and a lifting unit 170 (which may also be referred to herein as a lifting assembly 170).

The roller unit 160 winds or unwinds the display part DP fixed to the roller unit 160 by rotating clockwise or counterclockwise. The roller unit 160 includes the roller 161 and a roller support unit 162 (which may also be referred to herein as a roller support 162 or a support 162).

The roller 161 is a member on which the display part DP is wound. The roller 161 may have a cylindrical shape in one non-limiting example. A lower edge of the display part DP may be fixed to the roller 161. When the roller 161 rotates in a first direction, such as clockwise or counterclockwise, the display part DP is wound on the roller 161. On the contrary, when the roller 161 rotates in the opposite direction, the display part DP is unwound from the roller 161.

Referring to FIG. 3, the roller 161 may include at least a part of the outer peripheral surface having a flat surface and the other part of the outer peripheral surface having a curved surface. The roller 161 has a cylindrical shape overall but may be partially flat. That is, a part of the outer peripheral surface of the roller 161 is flat and the other part of the outer peripheral surface is curved. For example, the roller 161 may be formed by a curved part 161R and a flat part 161F. Also, a plurality of flexible films and a printed circuit board of the display part DP may be mounted on the flat part 161F of the roller 161. However, the roller 161 may have a completely cylindrical shape or may have any selected shape in some embodiments, is not limited solely to a cylindrical shape or a cylindrical shape that is at least partially flat.

Returning to FIG. 2, the roller support unit 162 supports the roller 161 at selected locations, such as at both opposite sides or ends of the roller 161. As shown in FIG. 2, the display device 100 may include a selected number of roller support units 162, such as one, two, three, four, five, six or more roller support units 162. The roller support units 162 are placed on a bottom surface HPF of the housing part HP. Further, upper side surfaces of the respective roller support units 162 are coupled with both ends of the roller 161 in an embodiment. Thus, the roller support unit 162 may support the roller 161 with the roller 161 spaced apart from the bottom surface HPF of the housing part HP. The roller 161 may be rotatably coupled with the roller support unit 162 to allow for rotation of the roller 161, as described herein.

The lifting unit 170 moves the display part DP up and down in the orientation shown in FIG. 2 according to a driving direction of the lifting unit 170. The lifting unit 170 includes a link unit 171 (which may also be referred to herein as a link 171 or a link assembly 171), a head bar 172, a motor 175, and a rotating unit 176 (which may also be referred to herein as an axle 176 or a ball screw assembly 176).

The link unit 171 of the lifting unit 170 includes a plurality of links including a first link 171a and a second link 171b and a hinge unit 171c (which may also be referred to herein as a hinge 171c) that connects the plurality of links 171a and 171b. The first link 171a and the second link 171b cross each other in the form of scissors or an "X" and are rotatably fastened by the hinge unit 171c. The link unit 171 may include a plurality of links 171a and 171b crossing each other, but the number of links is not limited. In some non-limiting examples, the link unit 171 may include a single link or may include any selected number of links or pairs of links. When the link unit 171 moves up and down, the plurality of links 171a and 171b may rotate to be away from each other or close to each other. The link unit 171 may include a plurality of links 171a and 171b crossing each other, but is not limited thereto and may include a single link that may not be crossed.

The head bar 172 of the lifting unit 170 is fixed to the uppermost end of the display part DP. The head bar 172 is connected to the link unit 171 and may move the display part DP up and down according to a rotation of the plurality of links 171a and 171b of the link unit 171. That is, the display part DP may be moved up and down by the head bar 172 and the link unit 171.

The head bar 172 shields only a part of a surface of the display part DP adjacent to the uppermost edge of the display part DP so as not to shield images displayed on the front surface of the display part DP. The display part DP and the head bar 172 may be fixed by screws, but the present disclosure is not limited thereto.

The motor 175 may be connected to a power generation unit or power supply, such as a separate external power supply or a built-in battery, and supplied with power from the power generation unit. The motor 175 generates rotatory power and supplies driving force to the rotating unit 176.

The rotating unit 176 is connected to the motor 175 and changes a rotary movement of the motor 175 to a linear reciprocal movement. That is, the rotating unit 176 may change rotary movement of the motor 175 to a linear reciprocal movement of a structure fixed to the rotating unit 176. For example, the rotating unit 176 may be implemented as a ball screw including a shaft and a nut clamped to the shaft, but is not limited thereto. The nut translates along the shaft as the shaft rotates from the force applied to the shaft by the motor 175. Movement of the nut along the shaft results in linear movement of the link unit 171.

The motor 175 and the rotating unit 176 may move the display part DP up and down in cooperation with the link unit 171. The link unit 171 has a link structure and may receive driving force from the motor 175 and the rotating unit 176 and repeatedly perform folding and unfolding operations.

Specifically, when the display part DP is wound, as the motor 175 is driven, the structure of the rotating unit 176 may move linearly. That is, a part of the rotating unit 176 connected to one end of the second link 171b may move linearly. Thus, the one end of the second link 171b may move toward the motor 175. Also, the plurality of links 171a and 171b is folded, and, thus, the height of the link unit 171 may decrease. Further, while the plurality of links 171a and 171b is folded, the head bar 172 connected to the first link 171a is moved down. Also, one end of the display part DP connected to the head bar 172 is moved down.

When the display part DP is unwound, as the motor 175 is driven, the structure of the rotating unit 176 may move linearly. That is, a part of the rotating unit 176 connected to one end of the second link 171b may move linearly. Thus, the one end of the second link 171b may move in a direction getting away from the motor 175. Also, the plurality of links 171a and 171b is unfolded, and, thus, the height of the link unit 171 may increase. Further, while the plurality of links 171a and 171b is unfolded, the head bar 172 connected to the first link 171a is moved up. Also, the display part DP connected to the head bar 172 is moved up.

Therefore, when the display part DP is fully wound on the roller 161, the link unit 171 of the lifting unit 170 maintains a folded state. That is, when the display part DP is fully wound on the roller 161, the lifting unit 170 may have a minimum height. On the contrary, when the display part DP is fully unwound, the link unit 171 of the lifting unit 170 maintains an unfolded state. That is, when the display part DP is fully unwound, the lifting unit 170 may have a maximum height.

Meanwhile, when the display part DP is wound, the roller 161 may rotate and the display part DP may be wound on the roller 161. Referring to FIG. 3 as an example, the lower edge of the display part DP is connected to the roller 161. Further, when the roller 161 rotates in a first direction DR1, i.e., clockwise, the display part DP may be wound on the roller 161 so that a rear surface of the display part DP may be closely contacted with a surface of the roller 161.

When the display part DP is unwound, the roller 161 may rotate and the display part DP may be unwound from the roller 161. Referring to FIG. 3 as an example, when the roller 161 rotates in a second direction DR2, i.e., counterclockwise, the display part DP wound on the roller 161 may be unwound from the roller 161 and then presented outside the housing part HP.

In some embodiments, the driving part MP may have a different structure from the above-described driving part MP. That is, the roller unit 160 and the lifting unit 170 may be changed in configuration as long as the display part DP may be wound and unwound. Some of their components may be omitted or other components may be added.

Display Part

Figure 4A:
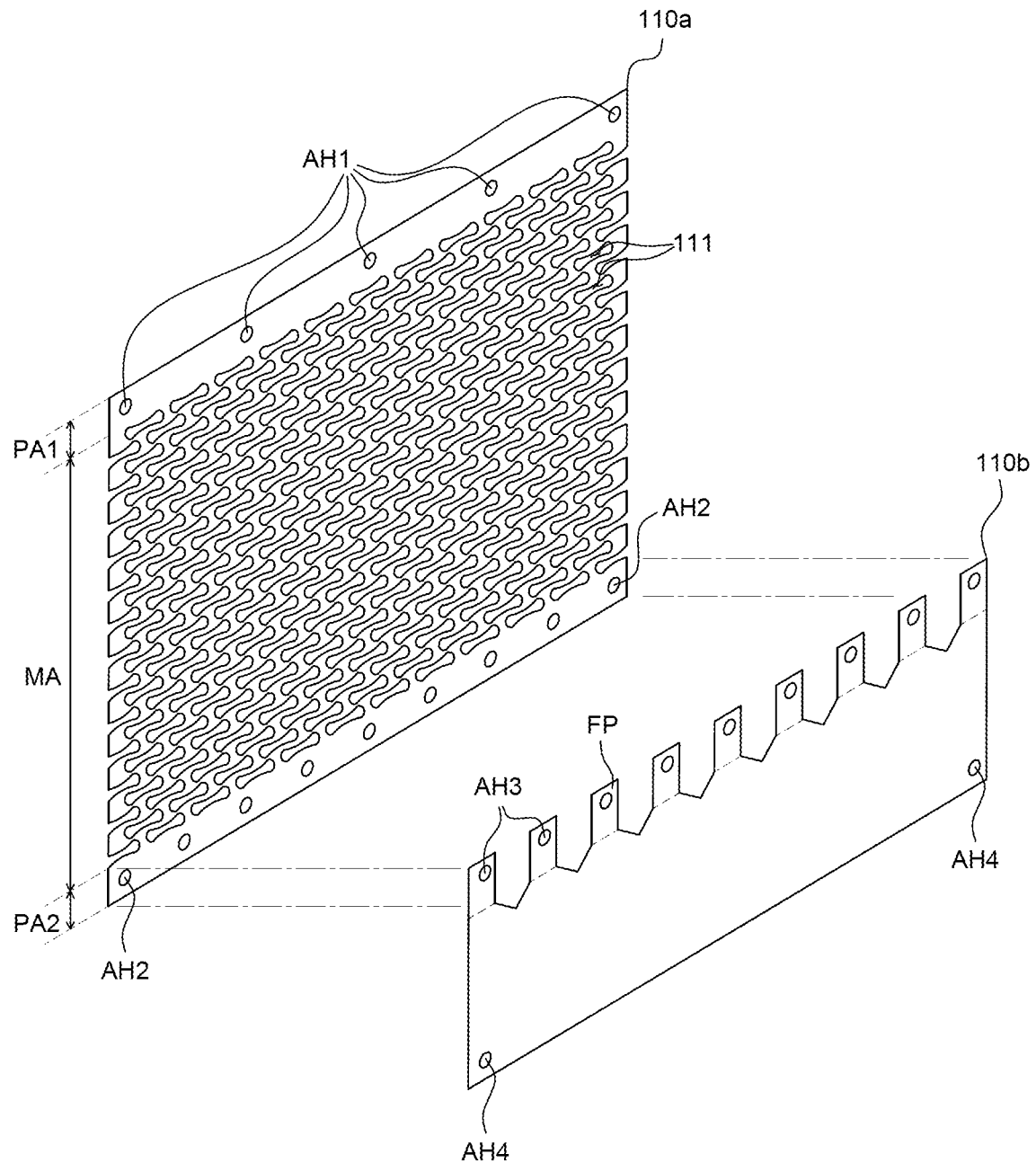
FIG. 4A is an exploded perspective view of a first cover and a second cover of the display device of FIG. 1A according to an embodiment of the present disclosure.
Figure 4B:
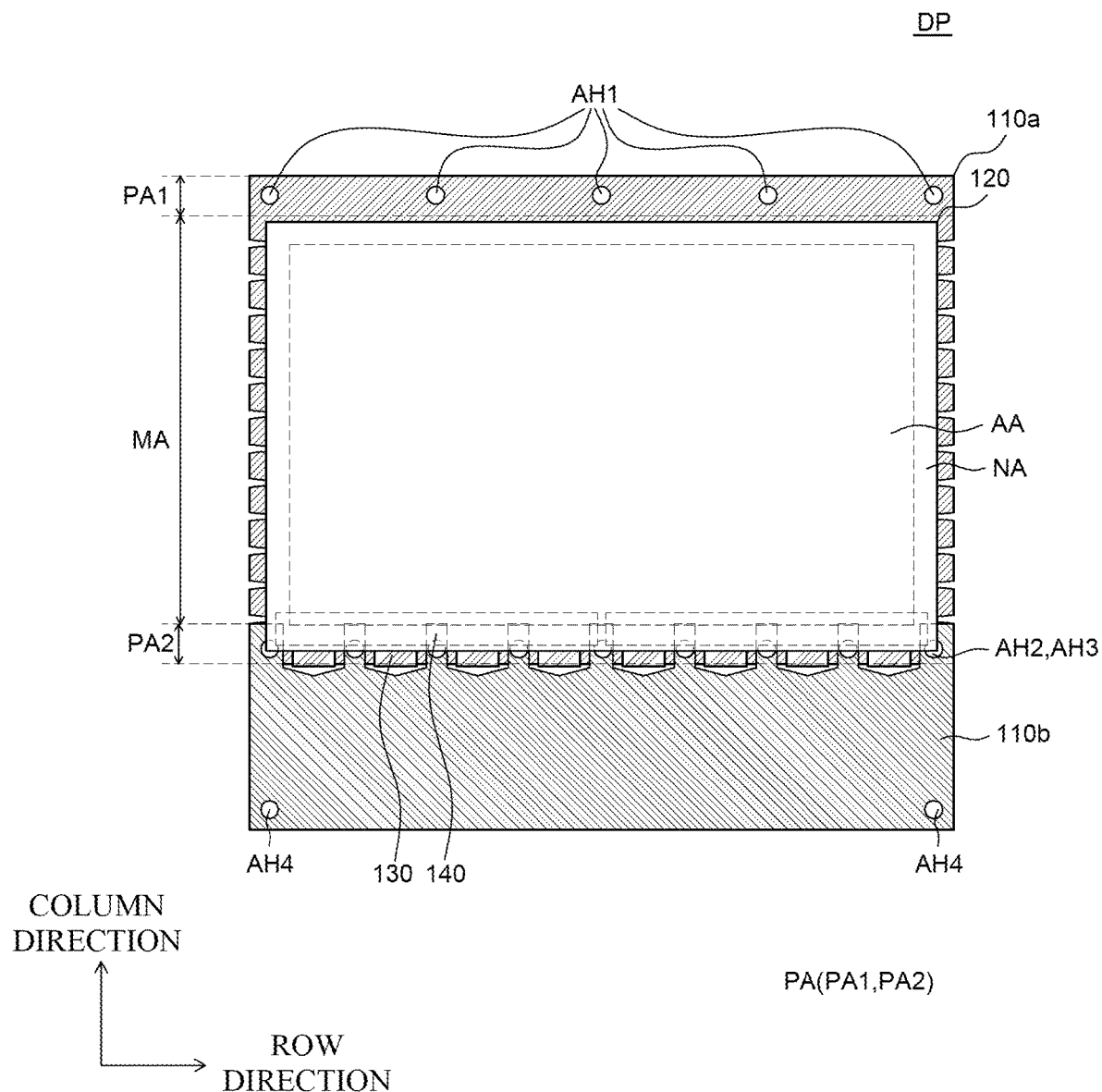
FIG. 4B is an elevational view of a display panel of the display device of FIG. 1A according to an embodiment of the present disclosure.

FIG. 4A is an exploded perspective view of a first cover and a second cover of the display device 100 according to an embodiment of the present disclosure. FIG. 4B is a plan view of a display part of the display device according to an embodiment of the present disclosure.

Referring to FIG. 4A and FIG. 4B, the display part DP includes a first cover 110a, a display panel 120, a plurality of flexible films 130, a printed circuit board 140 and a second cover 110b. However, the present disclosure is not limited thereto. The display part DP may be defined as including only the display panel 120, the plurality of flexible films 130 and the printed circuit board 140. For the convenience of description, FIG. 4A and FIG. 4B do not illustrate a cover part.

Referring to FIG. 4A and FIG. 4B, the first cover 110a is disposed on a rear surface of the display panel 120, and supports the display panel 120. Since the first cover 110a is disposed on the rear surface of the display panel 120, it may also be referred to as a back cover. The first cover 110a may be larger in size than the display panel 120. The first cover 110a may protect other components of the display part DP from an external environment.

The first cover 110a may be made of a rigid material, but at least a portion of the first cover 110a may be flexible to be wound or unwound along with the display panel 120. For example, the first cover 110a may be made of a metallic material such as Steel Use Stainless (SUS) or Invar, or plastic, but is not limited thereto. The material of the first cover 110a may vary in different designs according to various factors, such as the amount of thermal deformation, a radius of curvature, rigidity, and the like.

The first cover 110a may be fastened with the head bar 172 and the second cover 110b.

The first cover 110a includes a plurality of support areas PA and a malleable area MA. The plurality of support areas PA is an area in which a plurality of openings 111 is not disposed, and the malleable area MA is an area in which the plurality of openings 111 is disposed. Specifically, the first cover 110a includes a first support area PA1, the malleable area MA and a second support area PA2. The first support area PA1, the malleable area MA and the second support area PA2 are disposed in sequence from the uppermost end of the first cover 110a to a lowermost end of the first cover 110a. Herein, the first cover 110a is wound or unwound in a column direction (i.e., a vertical direction in the orientation shown in FIG. 4A), and, thus, the plurality of support areas PA and the malleable area MA may be disposed along the column direction.

The first support area PA1 of the first cover 110a is the uppermost area of the first cover 110a and is fastened with the head bar 172. The first support area PA1 includes first fastening holes AH1 so as to be fastened with the head bar 172. For example, screws that pass through the head bar 172 and the first fastening holes AH1 are disposed to fasten the head bar 172 and the first support area PA1. Further, because the first support area PA1 is fastened with the head bar 172, when the link unit 171 ascends or descends to move the head bar 172, the first cover 110a may also ascend or descend together with the head bar 172. Also, the display panel 120 attached to the first cover 110a may ascend or descend with the first cover 110a in a similar manner. Although five first fastening holes AH1 are illustrated in FIG. 4A and FIG. 4B, the number of first fastening holes AH1 is not limited thereto and may include more or less than 5 first fastening holes AH1. Further, although FIG. 4A and FIG. 4B illustrate that the first cover 110a is fastened with the head bar 172 using the first fastening holes AH1, the present disclosure is not limited thereto. The first cover 110a and the head bar 172 may be fastened with each other without a separate fastening hole.

The malleable area MA of the first cover 110a is an area extending from the first support area PA1 to a lower side of the first cover 110a. The malleable area MA is an area in which the plurality of openings 111 is disposed and to which the display panel 120 is attached. Specifically, the malleable area MA is wound on or unwound from the roller 161 together with the display panel 120. The malleable area MA may overlap at least the display panel 120 among other components of the display part DP.

The second support area PA2 of the first cover 110a is an area extending from the malleable area MA, and is the lowermost area of the first cover 110a. In the second support area PA2, one end of the display panel 120 is disposed. For example, a pad area, which is a non-display area at one end of the display panel 120, may be disposed in the second support area PA2.

Referring to FIG. 4A, in the second support area PA2, second fastening holes AH2 are disposed. The second fastening holes AH2 may be configured to receive a fastener to fix a cover part described below, the second cover 110b and the first cover 110a to each other. Although nine second fastening holes AH2 are illustrated in FIG. 4A, the number of second fastening holes AH2 is illustrative and is not limited thereto and may include more or less than nine second fastening holes AH2.

Meanwhile, the plurality of openings 111 is only in the malleable area MA, but not in the first support area PA1 and the second support area PA2 in some embodiments. In an embodiment, the plurality of openings 111 are in the malleable area MA, the first support area PA1, or the second support area PA2, or some combination thereof. Specifically, the first fastening holes AH1 and the second fastening holes AH2 are formed in the first support area PA1 and the second support area PA2, respectively. However, the plurality of openings 111 in the malleable area MA are not formed in the first support area PA1 and the second support area PA2 in some embodiments. Also, the first fastening holes AH1 and the second fastening holes AH2 are different in shape from the plurality of openings 111.

The first support area PA1 is an area fixed to the head bar 172 and the second support area PA2 is an area where one end of the display panel 120, the plurality of flexible films 130 and the printed circuit board 140 are supported in some embodiments. The first support area PA1 and the second support area PA2 may have a higher rigidity than the malleable area MA. Further, since the first support area PA1 and the second support area PA2 have rigidity, the first support area PA1 and the second support area PA2 may be firmly fixed to the head bar 172 and the second cover 110b. The second support area PA2 may maintain a pad area at one end of the display panel 120 and the printed circuit board 140 in a flat state and thus protect the pad area of the display panel 120 and the printed circuit board 140. Therefore, the display part DP may be fixed to the head bar 172 of the driving part MP, thereby moving into and out of the housing part HP according to an operation of the driving part MP. Also, it is possible to protect the pad area at one end of the display panel 120 and the printed circuit board 140.

Meanwhile, FIG. 4A illustrates that the plurality of support areas PA and the malleable area MA of the first cover 110a are disposed in sequence along the column direction. However, if the first cover 110a is wound in a row direction, the plurality of support areas PA and the malleable area MA may be disposed along the row direction.

When the display part DP is wound or unwound, the plurality of openings 111 disposed in the malleable area MA of the first cover 110a may be deformed by stress which is applied to the display part DP. Specifically, when the display part DP is wound or unwound, the malleable area MA of the first cover 110a may be deformed as the plurality of openings 111 is contracted or expanded. Further, as the plurality of openings 111 is contracted or expanded, a slip phenomenon of the display panel 120 disposed on the malleable area MA of the first cover 110a is minimized. Thus, the stress applied to the display panel 120 may be minimized.

The second cover 110b may be fastened with the first cover 110a and the roller 161 to connect the first cover 110a to the roller 161. The second cover 110b may connect the first cover 110a to the roller 161 by the above-described method and finally connect the display panel 120 disposed on the first cover 110a to the roller 161. However, the present disclosure is not limited thereto. The shape of the second cover 110b or a connection method may vary depending on the design. In other words, the second cover 110b may be connected to the first cover 110a and the roller 161 with a number of different structures and methods.

A first end of the second cover 110b is the uppermost portion of the second cover 110b and may overlap one end of the first cover 110a, and in particular, a bottom end of the first cover 110a. For example, the first end of the second cover 110b may overlap the second support area PA2. The first end of the second cover 110b and a part or a portion of the first cover 110a may be connected to each other by overlapping them, or may be connected to each other using a connection member, but the present disclosure is not limited thereto.

The second cover 110b may include a plurality of fastening parts FP (which may also be referred to herein as fastening portions FP or fastening protrusions FP) that overlap the first cover 110a. The plurality of fastening parts FP is disposed at one end of the second cover 110b, and in particular, the plurality of fastening parts FP may extend from the uppermost portion of the second cover 110b with a generally rectangular shape. Also, the plurality of fastening parts FP may include a plurality of third fastening holes AH3 structured to receive fasteners to couple the second cover 110b to the first cover 110a. The plurality of fastening parts FP including the plurality of third fastening holes AH3 are spaced apart from each other and in some embodiments, are spaced equidistant from each other or at a selected distance from each other. The edge of the second cover 110B defining the spaces between the fastening parts FP may have a trapezoidal shape with a square or rectangular portion between the fastening parts FP and a triangular portion with a vertex extending into the second cover 110b below a bottom portion of the fastening parts FP, as shown in FIG. 4A. Also, a space where the plurality of flexible films 130 may be bent may be formed between the plurality of fastening parts FP, or in other words, the spaces between the plurality of fastening parts FP may have a size and a shape to receive bent portions of the plurality of flexible films 130. The third fastening holes AH3 may be holes for fixing the cover part to be described later and the second cover 110b to each other. Although nine third fastening holes AH3 are illustrated in FIG. 4A, the number of third fastening holes AH3 is illustrative and is not limited thereto and may include more or less than nine third fastening holes AH3.

FIG. 4A illustrates that the second fastening holes AH2 and the third fastening holes AH3 for fastening the cover part, as well as the first cover 110a and the second cover 110b are disposed in the second support area PA2 of the first cover 110a and the one end (i.e., the first end or upper end) of the second cover 110b, respectively. However, the first cover 110a, the second cover 110b and the cover part may be fastened with each other without a separate fastening hole.

Meanwhile, when the second support area PA2 and the plurality of fastening parts FP are wound on the roller 161, the outer peripheral surface of the roller 161 overlapping the second support area PA2 and the plurality of fastening parts FP may be the flat part 161F of the roller 161 in FIG. 3. Therefore, the second support area PA2 may always maintain a flat state regardless of it is wound on or unwound from the roller 161. The pad area at the one end or the bottom end of the display panel 120 and the printed circuit board 140 disposed in the second support area PA2 may also maintain a flat state.

A region from the one end of the second cover 110b where the plurality of flexible films 130 and the printed circuit board 140 are disposed to the other end of the second cover 110b coupled to the roller 161 is an extension region of the second cover 110b in order for the display area AA of the display panel 120 to be disposed outside the housing part HP. For example, when the first cover 110a and the display panel 120 are in a fully unwound state, the region from the other end of the second cover 110b fixed to the roller 161 to the one end of the second cover 110b where the plurality of flexible films 130 and the printed circuit board 140 are disposed may be disposed inside the housing part HP. The malleable area MA and the first support area PA1 where the display area AA of the display panel 120 is disposed may be disposed outside the housing part HP accordingly due to the arrangement of the second cover 110b. That is, the region from the other end of the second cover 110b fixed to the roller 161 to at least a part of the one end of the second cover 110b and the second support area PA2 may be disposed inside the housing part HP.

The other end of the second cover 110b is the lowermost portion of the second cover 110b that is fastened with the roller 161. The other end of the second cover 110b may include fourth fastening holes AH4 structured to receive fasteners to couple the other end of the second cover 110b to the roller 161. For example, fastening members that pass through the roller 161 and the fourth fastening holes AH4 may be disposed so that the roller 161 may be fastened with the other end of the second cover 110b. Further, as the other end of the second cover 110b is fastened with the roller 161, the display panel 120, the first cover 110a and the second cover 110b may be wound on or unwound from the roller 161. Although two fourth fastening holes AH4 are illustrated in FIG. 4A, the number of fourth fastening holes AH4 is not limited thereto and may include more or less than two fourth fastening holes AH4.

Meanwhile, the plurality of openings 111 are formed in the malleable area MA of the first cover 110a, but are not formed in the second cover 110b. In other words, the second cover 110b may not include any openings, except for the spaces between the fastening parts and the third and fourth fastening holes AH3, AH4. Specifically, the third fastening holes AH3 and the fourth fastening holes AH4 are formed at the one end and the other end, respectively, of the second cover 110b. However, the plurality of openings 111 in the malleable area MA of the first cover 110a are not formed in the second cover 110b. Also, the third fastening holes AH3 and the fourth fastening holes AH4 are different in shape from the plurality of openings 111.

The second cover 110b may be made of a material having flexibility so as to be wound on or unwound from the roller. For example, the second cover 110b may be made of a plastic material such as PET. However, the material of the second cover 110b is not limited thereto, and may vary according to design factors, such as the amount of thermal deformation, a radius of curvature, rigidity, and the like in some non-limiting examples.

In the present disclosure, the first cover 110a and the second cover 110b have been described as being separately provided, but the present disclosure is not limited thereto. The first cover 110a and the second cover 110b may be provided as one body or a single, unitary, integral structure.

Referring to FIG. 4B, the display panel 120 is disposed on one surface of the first cover 110a, which may be a front surface of the first cover 110a in some embodiments. On the one surface of the first cover 110a, the display panel 120 is disposed in the malleable area MA. The display panel 120 is configured to display images to the user. In the display panel 120, display elements for displaying images, driving elements for driving the display elements, lines for transmitting various signals to the display elements and the driving elements, and the like may be disposed.

The display elements may be defined differently depending on the type of the display panel 120. For example, if the display panel 120 is an organic light emitting display panel, the display elements may be organic light emitting elements each composed of an anode, an organic emission layer, and a cathode. For example, if the display panel 120 is a liquid crystal display panel, the display elements may be liquid crystal display elements. Hereinafter, the display panel 120 will be assumed as an organic light emitting display panel, but the display panel 120 is not limited to the organic light emitting display panel. Further, since the display device 100 according to an embodiment of the present disclosure is a rollable display device 100, the display panel 120 may be implemented as a flexible display panel 120 to be wound on or unwound from the roller 161.

The display panel 120 includes a display area AA and a non-display area NA.

The display area AA refers to an area where an image is displayed on the display panel 120. In the display area AA, a plurality of sub-pixels constituting a plurality of pixels and a driving circuit for driving the plurality of sub-pixels may be disposed. Each of the plurality of sub-pixels is a minimum unit of the display area AA, and a display element may be disposed on each of the plurality of sub-pixels. For example, an organic light emitting element composed of an anode, an organic emission layer, and a cathode may be disposed on each of the plurality of sub-pixels, but the present disclosure is not limited thereto. Further, the circuit for driving the plurality of sub-pixels may include a driving element, a line, and the like. For example, the circuit may be configured by a thin film transistor, a storage capacitor, a gate line, a data line, etc., but is not limited thereto.

The non-display area NA refers to an area where an image is not displayed. In the non-display area NA, various lines, circuits, and the like for driving the organic light emitting elements in the display area AA may be disposed. For example, in the non-display area NA, a link line which transmits signals to the plurality of sub-pixels and circuits of the display area AA or a driver IC, such as a gate driver IC or a data driver IC, may be disposed, but the present disclosure is not limited thereto. The non-display area NA may surround the display area AA in some embodiments.

Meanwhile, the non-display area NA includes a pad area.

The pad area refers to an area where a plurality of pads is disposed. The plurality of pads refers to electrodes for electrically connecting the plurality of flexible films 130 and the display panel 120. Thus, the plurality of flexible films 130 may be electrically connected to the display panel 120 through the plurality of pads. The pad area may refer to a portion of the non-display area NA that overlaps the second support area PA2 of the first cover 110a. However, the pad area may be formed in another selected portion of the non-display area NA and the present disclosure is not limited to any particular location for the pad area.

Referring to FIG. 4B, the plurality of flexible films 130 is disposed at one end of the display panel 120, which may be a bottom end of the display panel 120 in some embodiments. Each of the plurality of flexible films 130 includes various components on a base film 131 having flexibility and serves to supply signals to a plurality of sub-pixels constituting a plurality of pixels and driving circuits in the display area AA. The plurality of flexible films 130 may be electrically connected to the display panel 120. One end of each of the plurality of flexible films 130 is disposed in the non-display area NA of the display panel 120 and may supply power voltage, data voltage, etc., to the plurality of sub-pixels and driving circuits in the display area AA. Meanwhile, although eight flexible films 130 are illustrated in FIG. 4B, the number of the plurality of flexible films 130 may vary depending on the design and is not limited thereto and may include more or less than eight flexible films 130.

On the base film 131 of each of the plurality of flexible films 130, a driver IC 132 (see FIG. 5B), such as a gate driver IC and a data driver IC, may be disposed. The driver IC 132 is a component which processes data for displaying images and a driving signal for processing the data. The driver IC 132 may be disposed in a chip on glass (COG), a chip on film (COF), or a tape carrier package (TCP) manner depending on a mounting method. For the convenience of description, FIG. 4B illustrates that the driver IC 132 is mounted on each of the plurality of flexible films 130 in a chip on film manner, but the present disclosure is not limited thereto.

Meanwhile, each of the plurality of flexible films 130 includes a base film and data for displaying an image and various driver ICs for controlling the data disposed on the base film, and is configured to display an image. The plurality of flexible films 130 is electrically connected to the pad area at the one end of the display panel 120 and is bent toward a rear surface of the first cover 110a. One end of each of the plurality of flexible films 130 may be connected to the one end of the display panel 120 on one surface of the first cover 110a. Also, the other end of each of the plurality of flexible films 130 may be disposed on a surface opposite to the one surface of the first cover 110a. This will be described in further detail with reference to FIG. 5A through FIG. 5C.

Referring to FIG. 4B, the printed circuit board 140 is disposed on the rear surface of the first cover 110a and connected to the plurality of flexible films 130. That is, the printed circuit board 140 is disposed on the rear surface of the first cover 110a and electrically connected to the plurality of flexible films 130. The printed circuit board 140 is a component that supplies signals to the driver ICs of the plurality of flexible films 130. The printed circuit board 140 may include various components thereon for supplying various signals, such as a driving signal or a data signal, to the driver ICs. Meanwhile, although two printed circuit boards 140 are illustrated in FIG. 4B, the number of printed circuit boards 140 may vary depending on the design and is not limited thereto.

Although not illustrated in FIG. 4B, an additional printed circuit board connected to the printed circuit board 140 may be further disposed. For example, the printed circuit board 140 may be referred to as a source printed circuit board (source PCB) S-PCB on which a data driver is mounted. The additional printed circuit board connected to the printed circuit board 140 may be referred to as a control printed circuit board (control PCB) C-PCB on which a timing controller or the like is mounted. The additional printed circuit board may be disposed inside the roller 161, or may be disposed outside the roller 161 within the housing part HP, or may be disposed in direct contact with the printed circuit board 140.

Cover Part

Figure 5A:
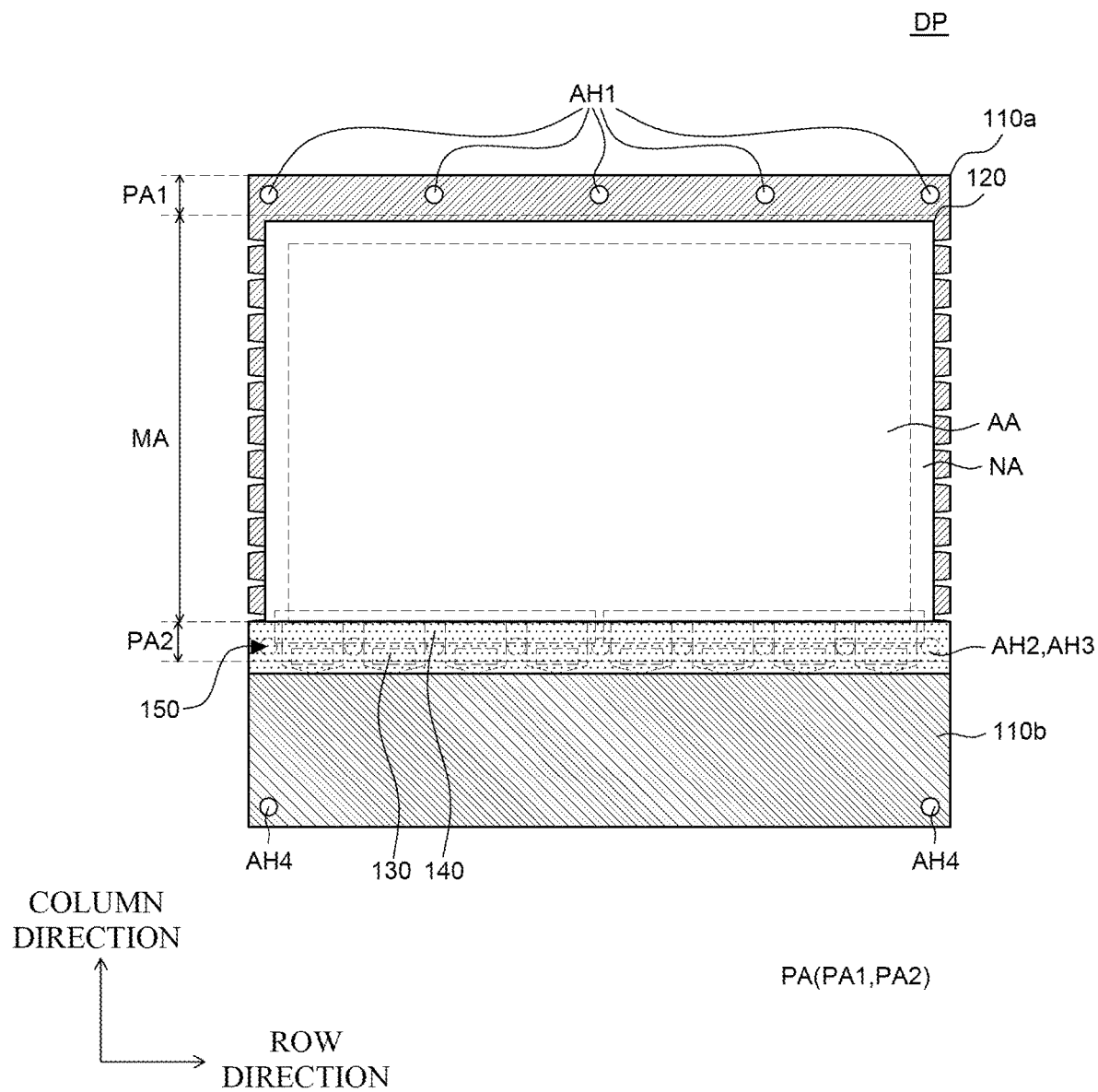
FIG. 5A is an elevational view of the display device of FIG. 1A according to an embodiment of the present disclosure.
Figure 5B:
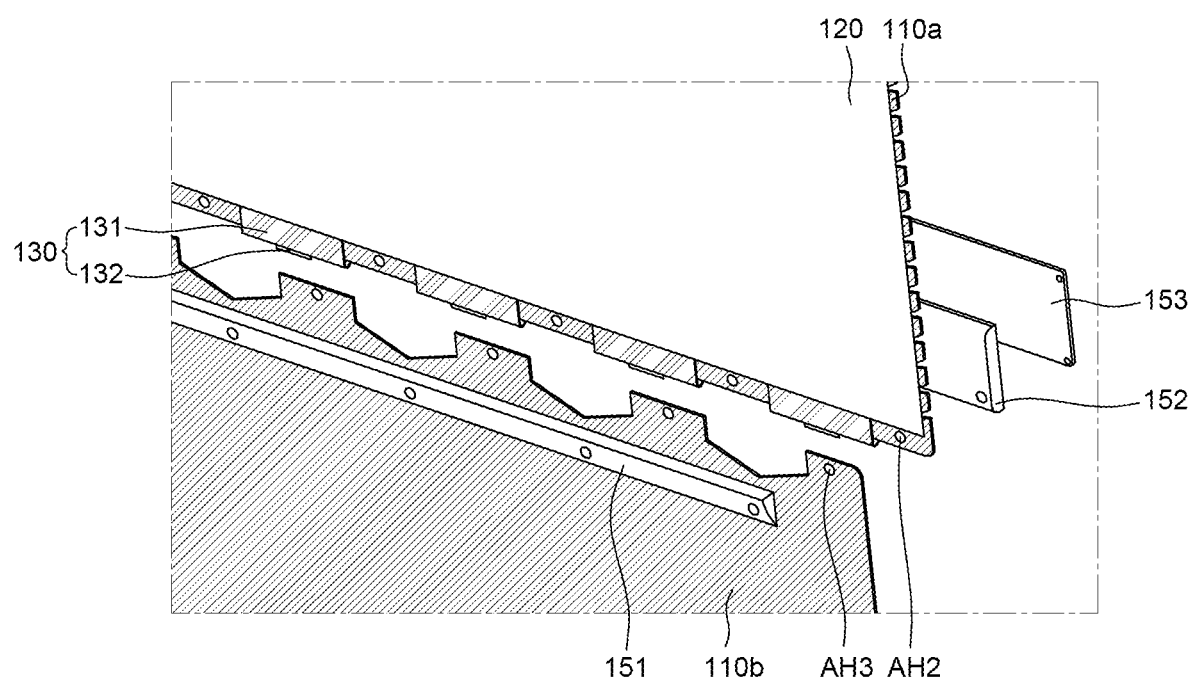
FIG. 5B is an exploded perspective view of the display device of FIG. 1A according to an embodiment of the present disclosure.
Figure 5C:
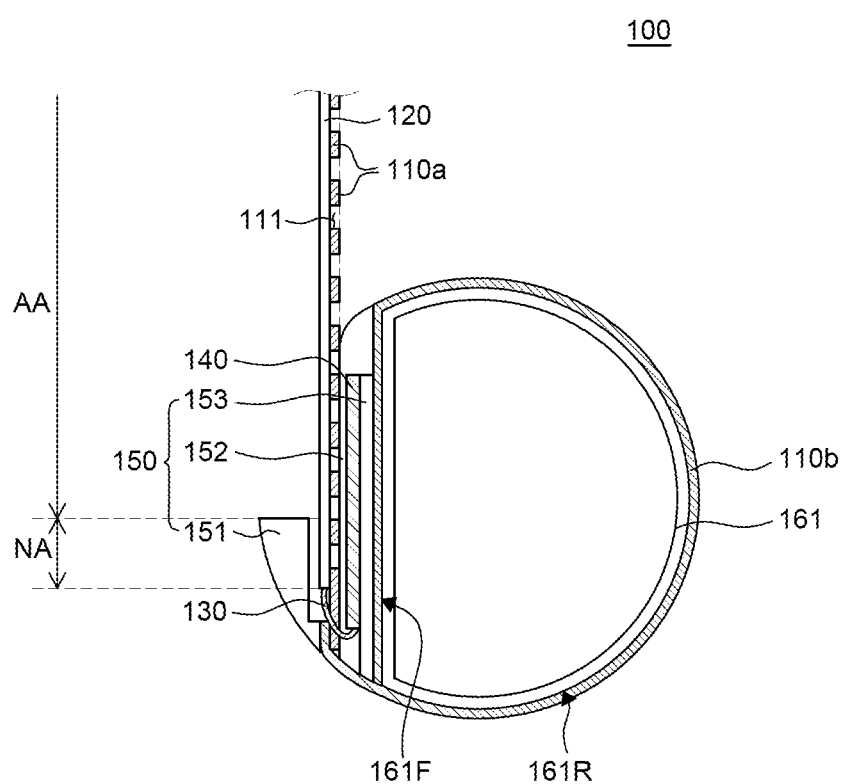
FIG. 5C is a cross-sectional view of the display device of FIG. 1A according to an embodiment of the present disclosure.

FIG. 5A is a plan view of the display device 100 according to an embodiment of the present disclosure. FIG. 5B is an exploded perspective view of the display device 100 according to an embodiment of the present disclosure. FIG. 5C is a cross-sectional view of the display device 100 according to an embodiment of the present disclosure.

Referring to FIG. 5A through FIG. 5C, the display device 100 includes a cover part 150 (which may also be referred to herein as a cover assembly 150 or a cover connection assembly 150) for accommodating the pad area of the display panel 120, the plurality of flexible films 130 and the printed circuit board 140. The cover part 150 may be disposed at one end of the second support area PA2 of the first cover 110a and the second cover 110b and may connect the first cover 110a and the second cover 110b to each other. Also, the cover part 150 may maintain the pad area at the one end of the display panel 120 and the printed circuit board 140 in a flat state and thus protect the plurality of flexible films 130.

Referring to FIG. 5B and FIG. 5C, the cover part 150 includes a top cover 151, a bottom cover 152 and a base plate 153.

The top cover 151 is disposed on one surface of the display panel 120, which may be a front surface of the display panel 120. Alternatively, the top cover 151 may be disposed on a front surface of the second cover 110b. The top cover 151 is disposed to cover the pad area, which is in the non-display area NA of the display panel 120, and the plurality of flexible films 130. The top cover 151 may be disposed not to cover the display area AA of the display panel 120, but to cover only the pad area, which is in the non-display area NA at the one end of the display panel 120. If the top cover 151 covers the display area AA as well, it may shield an image displayed on the display area AA. Therefore, the top cover 151 may be disposed to overlap only the non-display area NA. In particular, the top cover 151 may cover only the non-display area AA at the bottom of the display panel 120. Further, the top cover 151 may have a flat and planar top surface that terminates at a bottom edge of the display panel 120 in some embodiments.

The top cover 151 may be made of a material having rigidity and thus may not be deformed when the display part DP is wound. Also, the top cover 151 may protect the pad area at the one end or the bottom end of the display panel 120 and the plurality of flexible films 130.

An outer surface of the top cover 151, or a surface of the top cover 151 facing away from the display panel 120, has a convex shape, and may be connected to the curved part 161R of the roller 161 to form a round shape with the curved part 161R or a circular shape with the curved part 161R of the roller 161. That is, one surface of the top cover 151 may be a curved surface. When the display part DP is wound, the top cover 151 may be connected to the curved part 161R of the roller 161 to form a round shape with the curved part 161R or a circular shape with the curved part 161R.

The bottom cover 152 is disposed on the surface opposite to the one surface of the first cover 110a, i.e., on the rear surface of the first cover 110a. The bottom cover 152 is disposed between the first cover 110a and the printed circuit board 140. The bottom cover 152 may be fixed to the one end (i.e., the first end or the top end) of the second cover 110b, and may be disposed corresponding to the entire second support area PA2 of the first cover 110a and a part of the malleable area MA. The pad area at the one end (i.e., the bottom end) of the display panel 120, the plurality of flexible films 130 and the printed circuit board 140 may be mounted on the bottom cover 152.

The base plate 153 is disposed on a rear surface of the bottom cover 152. The base plate 153 may have a generally flat and planar plate shape, and may cover the rear surface of bottom cover 152 and an exposed surface of the printed circuit board 140.

Here, the first cover 110*a* and the second cover 110*b* may be fastened together by fixing members (which may also be referred to herein as fasteners) that pass through the top cover 151, the second cover 110*b*, the first cover 110*a*, the bottom cover 152 and the base plate 153. Herein, the fixing members may be, for example, screw members, such as screws or bolts, but are not limited thereto.

The base plate 153 may be disposed corresponding to a position where the printed circuit board 140 is mounted on the bottom cover 152. Also, the bottom cover 152 has a groove corresponding in shape to the base plate 153, and the base plate 153 is mounted on the groove of the bottom cover 152. A surface formed by connecting one surface of the bottom cover 152 and one surface of the base plate 153 may be a flat surface without a protrusion.

Accordingly, the base plate 153 covers the exposed surface of the printed circuit board 140 and thus may accommodate the printed circuit board 140 without exposing the printed circuit board 140 to the outside. Also, the rear surface of the bottom cover 152 does not have a protrusion, and, thus, when the cover part 150 is wound on the roller, the cover part 150 may be completely mounted on the flat part 161F of the roller 161.

Referring to FIG. 5B and FIG. 5C, the plurality of flexible films 130 may be bent from the one end of the display panel 120 so as to cover an end portion of the first cover 110*a*. The flexible films 130 electrically connected to the pad area at the one end (i.e., the bottom end) of the display panel 120 are bent from an end portion of the first cover 110*a* toward the rear surface of the bottom cover 152. Then, the flexible films 130 may be electrically connected to the printed circuit board 140 mounted on the rear surface of the bottom cover 152. Here, the second cover 110*b* may include the plurality of fastening parts FP that overlaps the first cover 110*a*, and the plurality of flexible films 130 may be bent at the end portion of the first cover 110*a* through a space between the plurality of fastening parts FP, as described above.

In the display device 100 according to an embodiment of the present disclosure, the cover part 150 maintains the pad area of the display panel 120 and the printed circuit board 140 in a flat state. Thus, it is possible to minimize damage to the display panel 120 and the printed circuit board 140. Specifically, when the display part DP is wound on the roller 161, the first cover 110*a* and the second cover 110*b* may be wound while being bent according to the shape of the roller 161. The display panel 120 and the printed circuit board 140 may also be wound while being bent according to the shape of the roller 161. In a conventional display device that is repeatedly wound and unwound, cracks are highly likely to occur in the vicinity of the edge of the display panel. For example, when the pad area of the display panel is repeatedly bent, cracks are highly likely to occur in the vicinity of the pad area. In the pad area, a plurality of pads and various lines which are made of a metallic material having a high rigidity and a low flexibility may be disposed so that they may be easily cracked due to stress. The cracks may spread to the other part of the display panel, which may result in a defect of the display device. Further, when the printed circuit board made of a rigid material is bent, the printed circuit board may be broken. In contrast, the pad area of the display panel 120 and the printed circuit board 140 of the printed circuit board may be disposed on the rear surface of the bottom cover 152 of the cover part 150 that is made of a material having rigidity. Accordingly, the pad area and the printed circuit board 140 may be maintained in a flat state and may be protected, which significantly reduces the likelihood of cracking at the lower edge of the display panel.

Then, the second support area PA2 of the first cover 110*a* having rigidity and the one end of the second cover 110*b* are allowed to overlap the pad area and the printed circuit board 140. Thus, the pad area and the printed circuit board 140 may be supported to be maintained in a flat state. Also, the roller 161 has the flat part 161F on which the cover part 150 is wound. Thus, the pad area, the printed circuit board 140 and the bottom cover 152 may be wound on the roller 161 so as to be flat according to the present disclosure. Therefore, even when the pad area and the printed circuit board 140 are wound on the roller 161, they may be maintained in a flat state. For example, when the display part DP is fully wound, the pad area and the printed circuit board 140 are mounted on the flat part 161F of the roller 161 so as to be flat. Also, the top cover 151 covers the pad area, and the bottom cover 152 and the base plate 153 are disposed to cover the printed circuit board 140. Therefore, even when another portion of the display part DP is wound on the pad area and the printed circuit board 140, it is possible to suppress interference with the pad area and the printed circuit board 140. Accordingly, in the display device 100 according to an embodiment of the present disclosure, the cover part 150 that supports the pad area and the printed circuit board 140 maintains the pad area and the printed circuit board 140 in a flat state and protects the pad area and the printed circuit board 140 from external impacts. Moreover, in the display device 100 according to an embodiment of the present disclosure, the flat part 161F is formed as the outer peripheral surface of the roller 161. Thus, it is possible to suppress bending of the pad area and the printed circuit board 140 while minimizing damage to the display panel 120 and the printed circuit board 140 compared to conventional flexible displays.

Referring to FIG. 5C, the display panel 120 is disposed on a top surface of the bottom cover 152 of the cover part 150. That is, the non-display area of the display panel 120 and a part of the display area are disposed on the flat top surface of the bottom cover 152. Thus, a boundary between the non-display area and the display area of the display panel 120 is located at the top surface of the bottom cover 152. Therefore, the top cover 151 has a shape for exposing the display area AA of the display panel 120. Specifically, the top cover 151 may be disposed overlapping only the non-display area NA of the display panel 120 with a flat and planar upper surface so as not to shield or obstruct any portion of the display area AA of the display panel 120. Here, a front surface of the top cover 151 may correspond in shape to the curved part 161R of the roller 161. Also, at least one side surface of the bottom cover 152 may correspond in shape to the curved part 161R of the roller 161.

In the display device 100 according to an embodiment of the present disclosure, a portion of the display panel 120 disposed on a flat top surface of the cover part 150 increases in size or thickness. Thus, stress applied to the display panel 120, and particularly to a substrate 121 of the display panel 120 may be minimized. Specifically, the non-display area NA at a lower end of the display panel 120 and a part of the display area adjacent to the non-display area NA may be disposed on the flat top surface of the cover part 150. Also, the top cover 151 may have a shape for exposing the display area AA of the display panel 120. Therefore, a portion of the display panel 120 which is not deformed by a winding or unwinding operation of the display panel 120 may increase in size. Accordingly, in the display device 100 according to an embodiment of the present disclosure, it is possible to reduce stress applied to the display panel 120 and also possible to suppress the occurrence of cracks in the display panel 120. Therefore, the life of the display panel 120 may be improved.

Second Top Cover

Figure 6A:
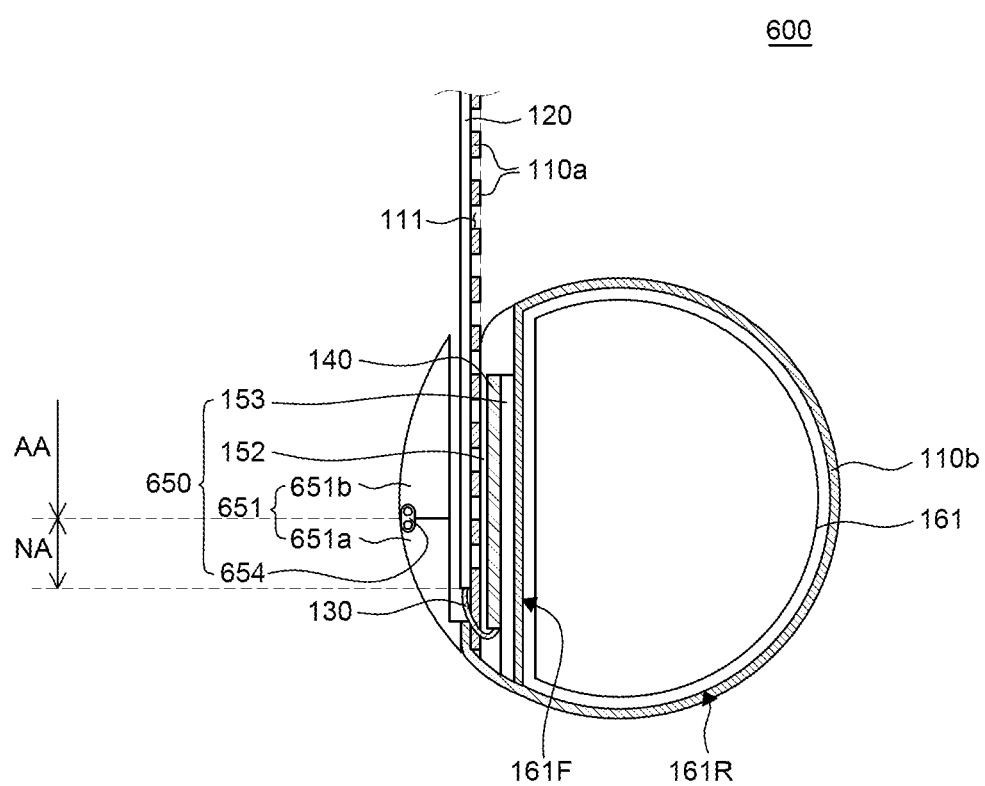
FIG. 6A is a cross-sectional view of a display device according to another embodiment of the present disclosure.
Figure 6B:
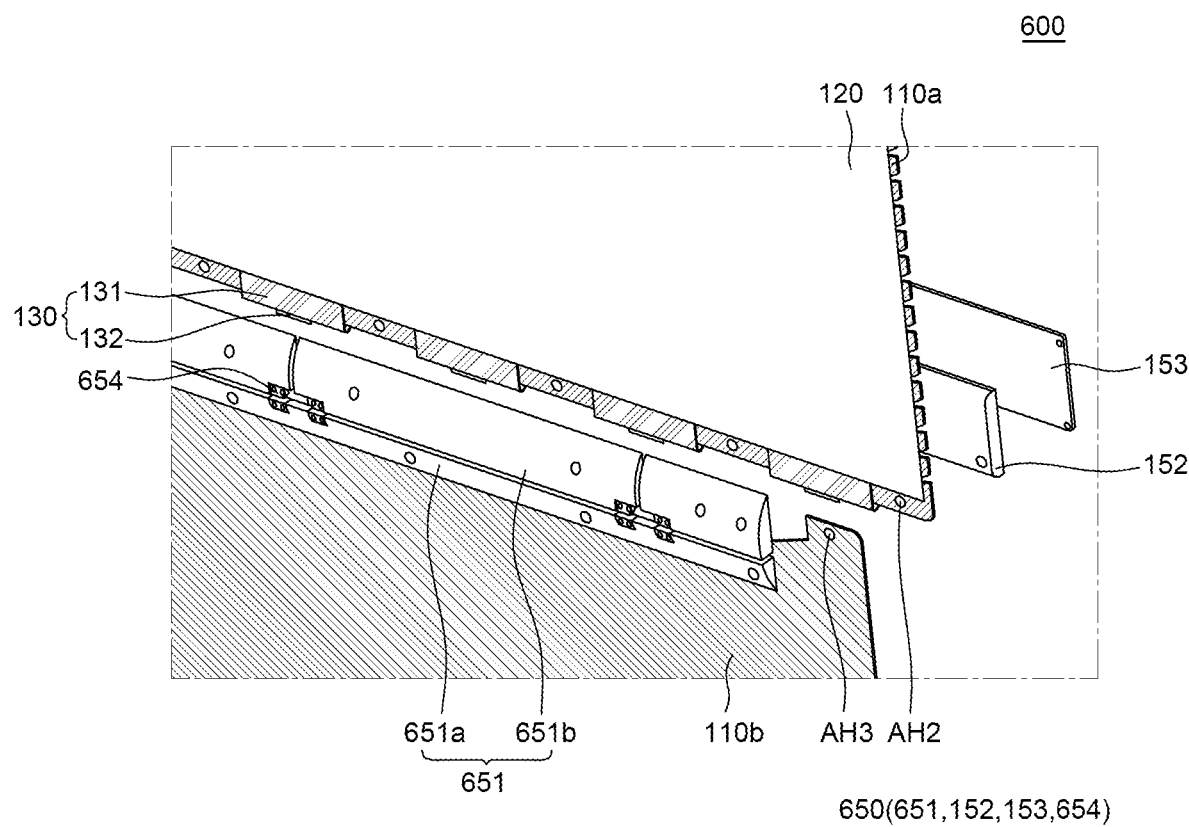
FIG. 6B is an exploded perspective view of the display device of FIG. 6A according to an embodiment of the present disclosure.

FIG. 6A is a cross-sectional view of a display device according to another embodiment of the present disclosure. FIG. 6B is an exploded perspective view of the display device according to another embodiment of the present disclosure. A display device 600 shown in FIG. 6A and FIG. 6B has substantially the same configuration as the display device 100 shown in FIG. 1 through FIG. 5C except for a cover part 650. Thus, repeated description will be omitted.

Referring to FIG. 6A and FIG. 6B, the cover part 650 of the display device 600 according to another embodiment of the present disclosure includes a top cover 651, the bottom cover 152, the base plate 153 and a connection member 654.

The top cover 651 includes a first top cover 651a and a second top cover 651b.

The first top cover 651a is disposed on one surface of the display panel 120, which may be a front surface of the display panel 120. The first top cover 651a is disposed to cover the pad area of the display panel 120 and the plurality of flexible films 130. The first top cover 651a may be disposed not to cover the display area AA of the display panel 120, but to cover only the pad area, which is in the non-display area NA at the one end or the bottom end of the display panel 120. That is, the first top cover 651a may be disposed to overlap only the non-display area NA of the display panel 120 in some embodiments.

The first top cover 651a may be made of a material having rigidity and thus may not be deformed when the display part DP is wound. Also, the first top cover 651a may protect the pad area at the one end or the bottom end of the display panel 120 and the plurality of flexible films 130.

An outer or front surface of the first top cover 651a has a convex shape, and may be connected to the curved part 161R of the roller 161 to form a round shape with the curved part 161R or a circular shape with the curved part 161R of the roller 161. That is, one surface of the first top cover 651a may be a curved surface. Further, when the display part DP is wound, the first top cover 651a may be connected to the curved part 161R of the roller 161 to form a round shape with the curved part 161R or a circular shape with the curved part 161R of the roller 161.

The second top cover 651b is disposed on the one surface of the display panel 120, which may be the front surface of the display panel 120. The second top cover 651b is disposed to cover the display area AA of the display panel 120 in some embodiments.

The second top cover 651b may be made of a material having rigidity and thus may not be deformed when the display part DP is wound. Also, the second top cover 651b may protect the display area AA of the display panel 120.

An outer surface of the second top cover 651b has a convex shape to form a round shape with the curved part 161R of the roller 161 and the first top cover 651a. That is, one surface of the second top cover 651b may be a curved surface. More specifically, the first top cover 651a and the second top cover 651b may each have an outer convex surface corresponding to approximately one eighth of the diameter of the roller 161. Thus, when the first top cover 651a is coupled to the second top cover 651b and the top covers 651a, 651b are disposed on the flat part 161F of the roller 161, the resulting combination forms a circular or cylindrical shape as shown in FIG. 6A.

The connection member 654 is a component for connecting the first top cover 651a and the second top cover 651b. Specifically, the connection member 654 is a member that connects the first top cover 651a and the second top cover 651b so that the second top cover 651b may rotate with respect to the first top cover 651a. The connection member 654 may be a hinge or may have, for example, a hinge structure, but is not limited thereto. Various members may be used as the connection member 654 to connect the first top cover 651a and the second top cover 651b to enable rotation of the second top cover 651b with respect to the first top cover 651a.

Hereinafter, a rotation operation of the second top cover 651b of the display device 600 according to another embodiment of the present disclosure will be described in more detail with reference to FIG. 7A through FIG. 7H.

Figure 7A:
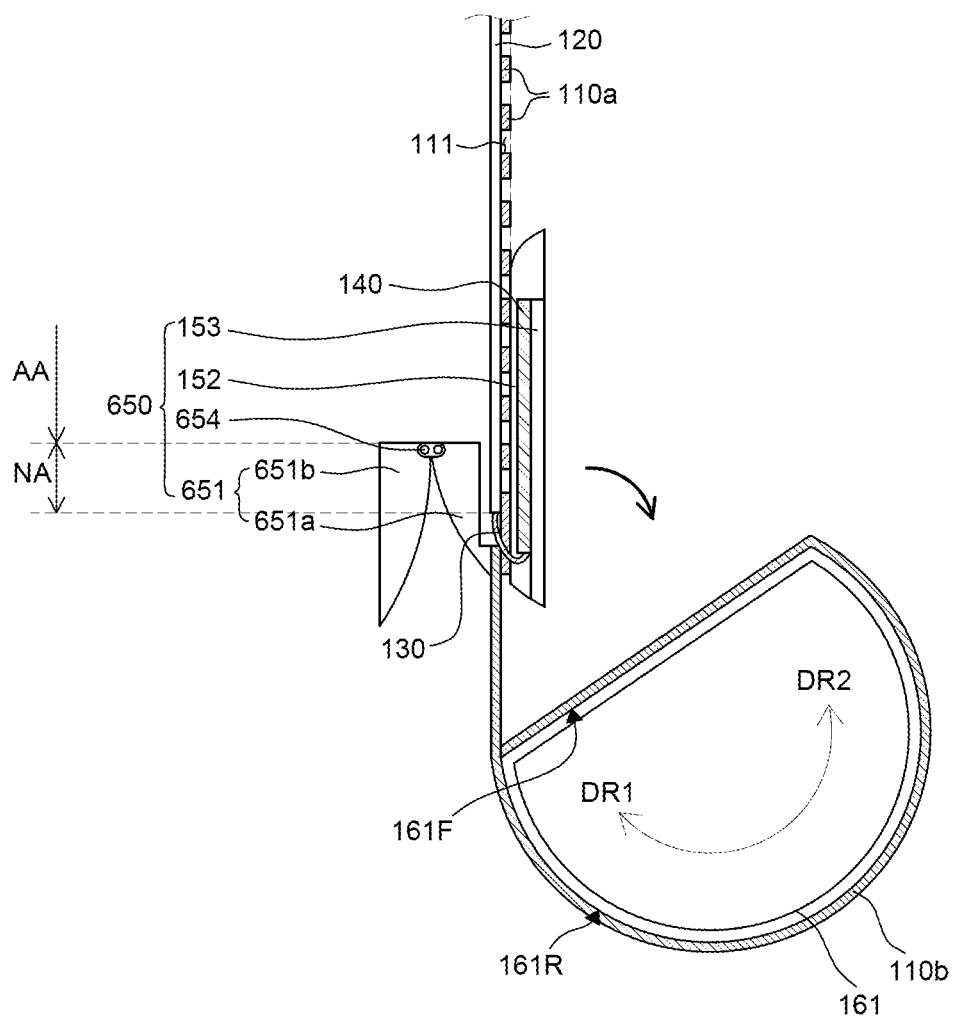
FIG. 7A through FIG. 7H are cross-sectional views illustrating steps in winding and unwinding operations of the display device of FIG. 6A according to an embodiment of the present disclosure.
Figure 7B:
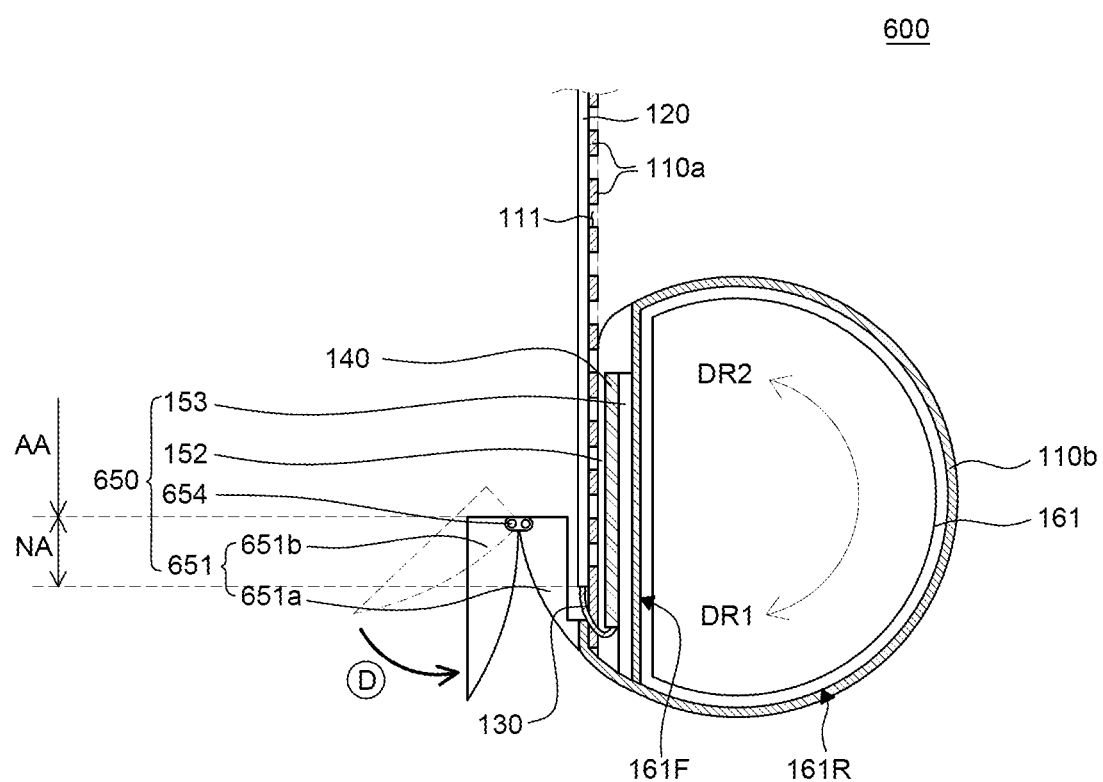
Figure 7C:
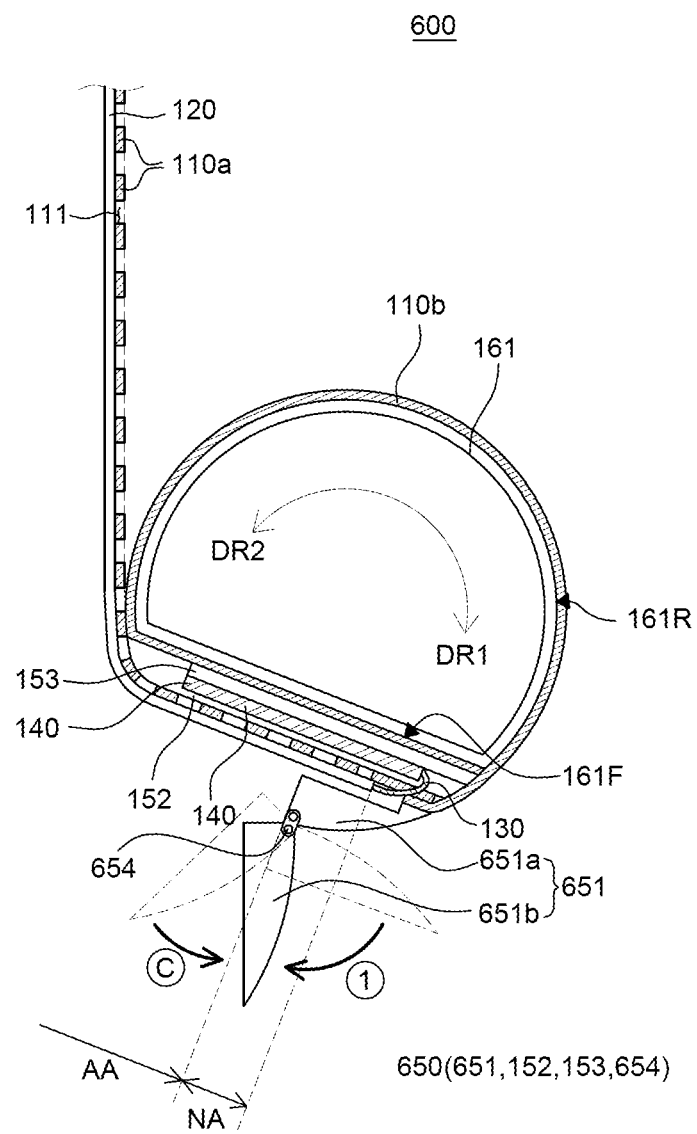
Figure 7D:
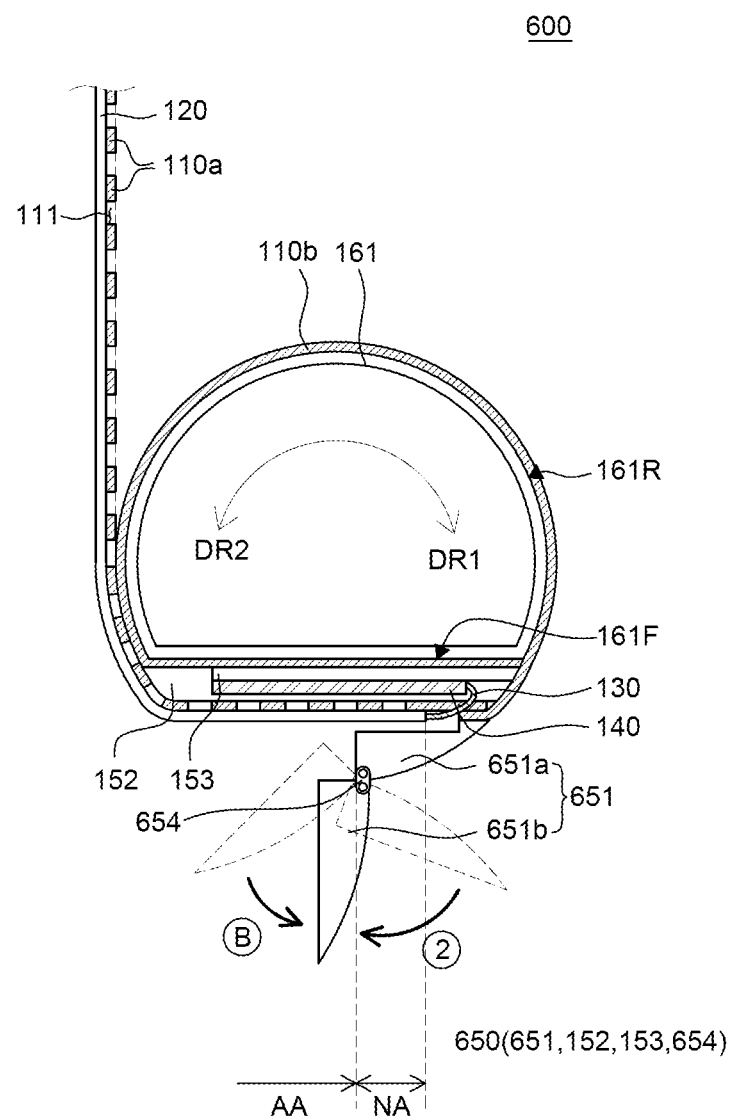
Figure 7E:
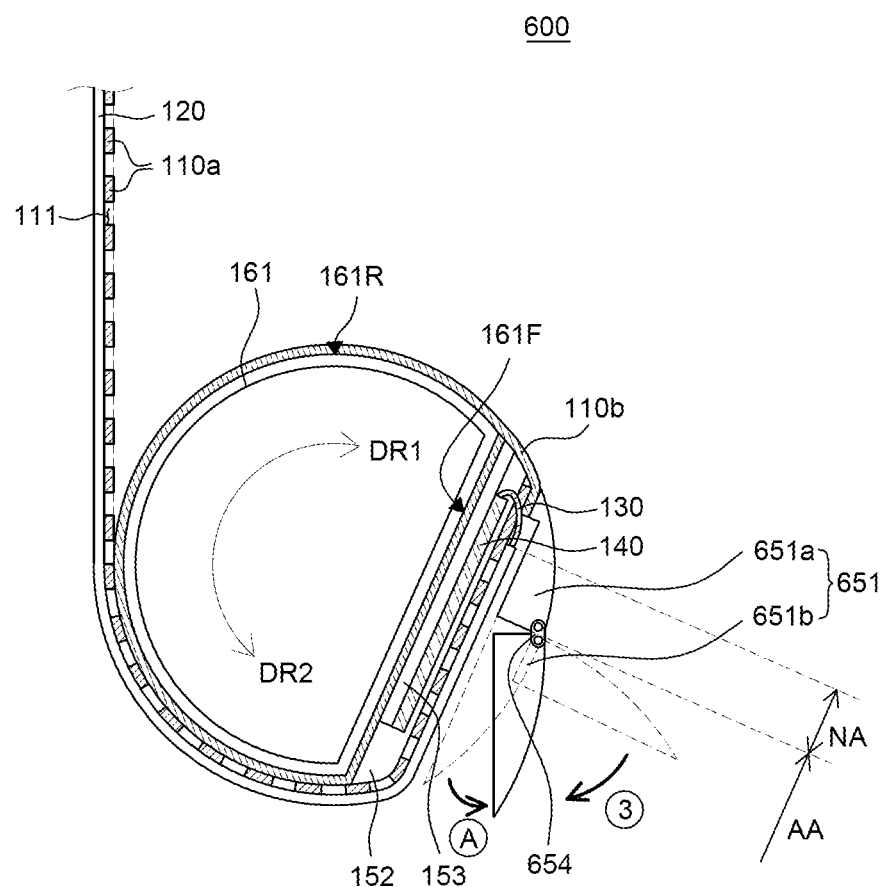
Figure 7F:
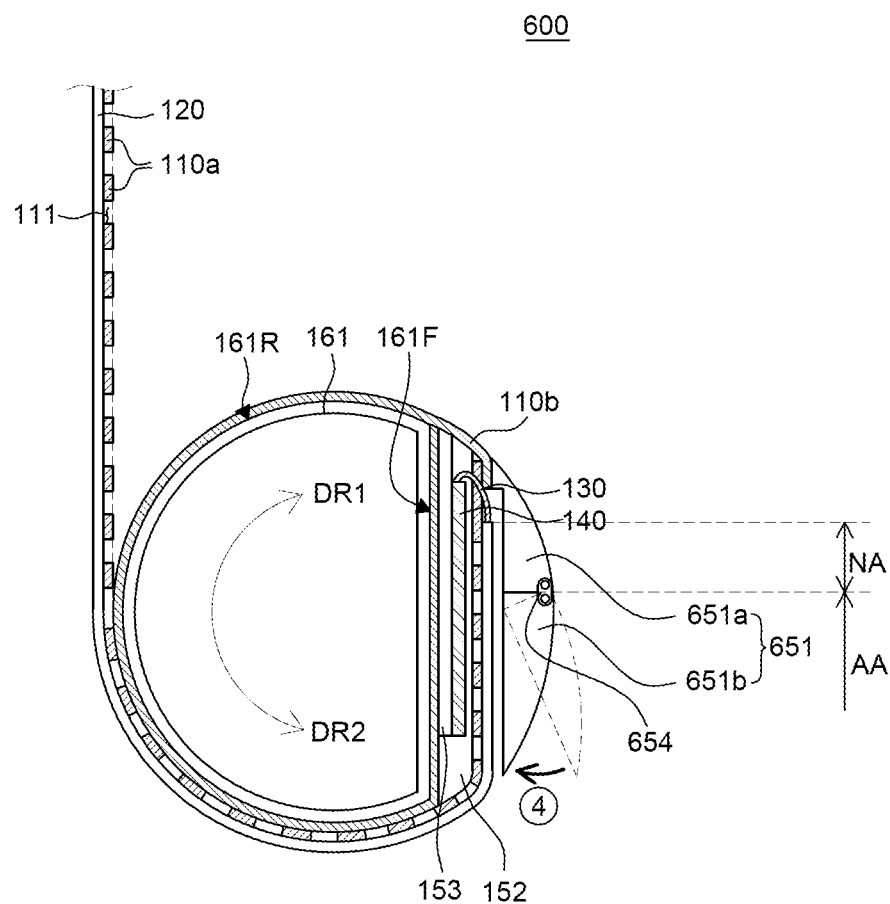
Figure 7G:
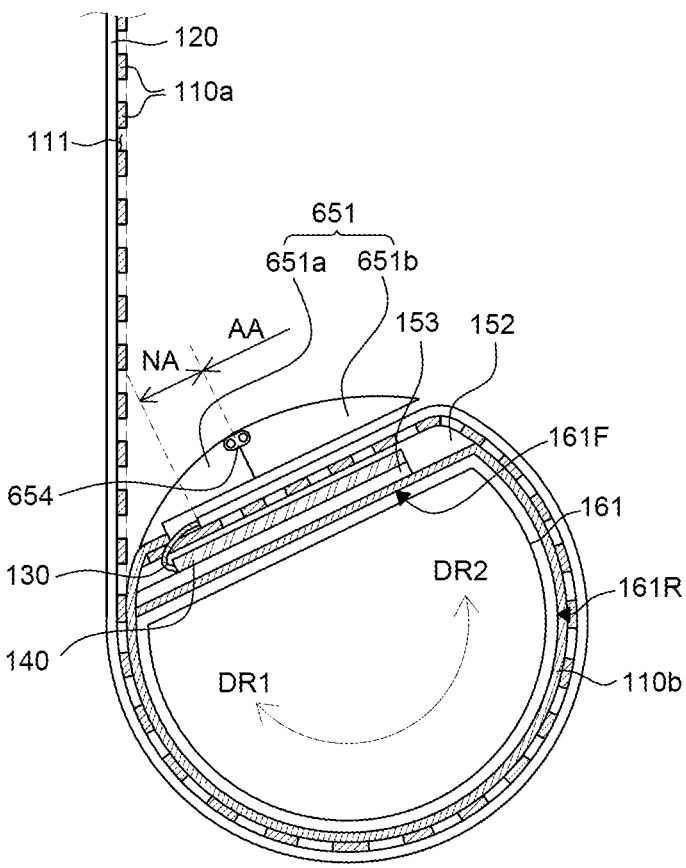
Figure 7H:
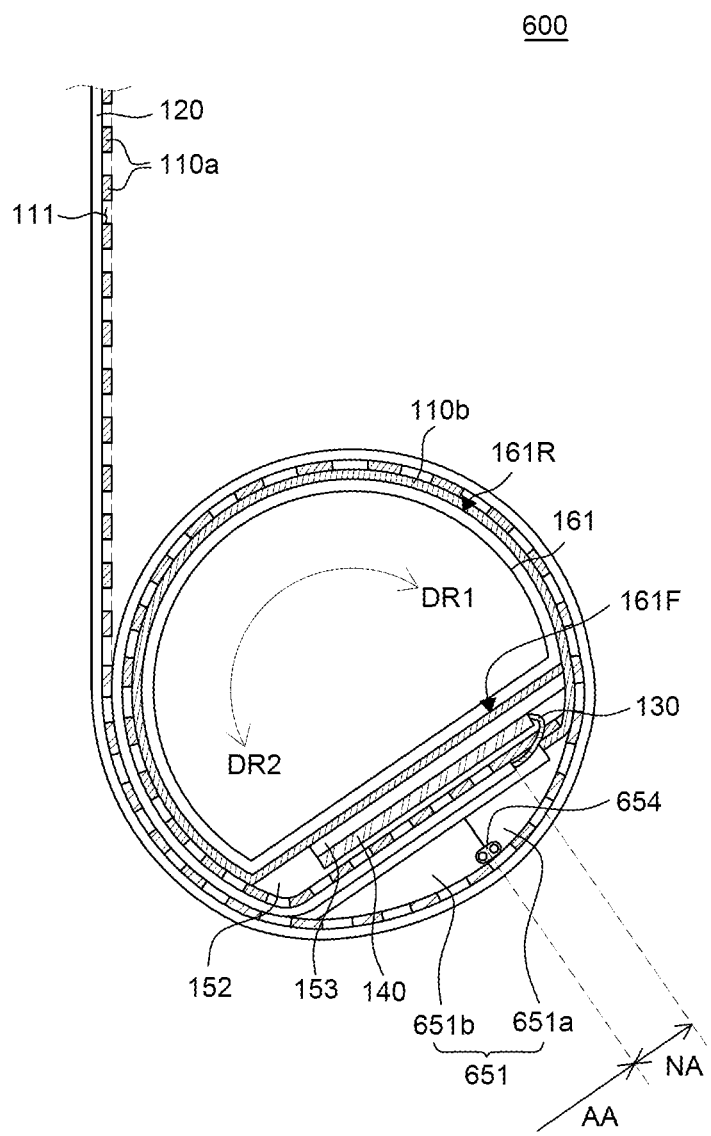

FIG. 7A through FIG. 7H are cross-sectional views for explaining winding and unwinding operations of the display device according to another embodiment of the present disclosure. FIG. 7A through FIG. 7H illustrate a process in which the display panel 120 is wound and the second top cover 651b is disposed on the display area AA in a sequential manner. Also, FIG. 7H through FIG. 7A illustrate a process in which the display panel 120 is unwound and the second top cover 651b exposes the display area AA in a sequential manner. Here, arrows ① through ④ indicate the process in which the display panel 120 is wound and the second top cover 651b is disposed on the display area AA. Also, arrows Ⓐ through Ⓓ indicate the process in which the display panel 120 is unwound and the second top cover 651b exposes the display area AA. In FIG. 7A through FIG. 7H, dotted lines are used to explain the positions of the second top cover 651b in previous stages.

First, the process in which the display panel 120 is wound and the second top cover 651b is disposed on the display area AA will be described with reference to FIG. 7A through FIG. 7H.

Referring to FIG. 7A and FIG. 7B, as the display panel 120 is wound around the roller 161 by rotating the roller 161 in the second direction DR2, i.e., counterclockwise, the cover part 650 approaches the flat part 161F of the roller 161. Then, the cover part 650 is disposed on the flat part 161F of the roller 161 as in FIG. 7B.

Then, referring to FIG. 7B and FIG. 7C, as the display panel 120 is wound by rotating the roller 161 in the second direction DR2, the second top cover 651b may be rotated around the connection member 654 due to gravity as indicated by the arrow ① in FIG. 7C. Since the second top cover 651b is rotated due to gravity, the second top cover 651b may be disposed in a direction perpendicular to the ground surface.

Thereafter, referring to FIG. 7C through FIG. 7F, as the display panel 120 is wound by rotating the roller 161 in the second direction DR2, the second top cover 651b may be rotated around the connection member 654 due to gravity as indicated by the arrows ②, ③ and ④. Since the second top cover 651b is rotated due to gravity, the second top cover 651b may be rotated while being disposed in the direction perpendicular to the ground surface until the second top cover 651b is rotated to a maximum amount allowable by the connection member 654. In other words, the second top cover 651b rotates while the flat part 161F of the roller 161 is facing a ground surface or is perpendicular to the ground surface (i.e., generally downward below the roller 161 in FIG. 7D). At the beginning of the rolling or winding process of the display device 600, the second top cover 651b is rotated about the connection member 654 approximately 180 degrees relative to the first top cover 651a such that the second top cover 651B is adjacent the first top cover 651a with the first and second top covers 651a, 651b side by side as in FIG. 7A. As the roller 161 rotates, the second top cover 651b rotates around the connection member 654 until the second top cover 651b is adjacent to the first top cover 651a but extending from the first top cover 651a to be disposed on the active area AA of the display panel 120, which corresponds to zero degrees of rotation of the second top cover 651b relative to the first top cover 651a, as generally designated by arrows ① through ④.

Then, referring to FIG. 7G, while the display panel 120 is wound by rotating the roller 161 in the second direction DR2, the second top cover 651b may be disposed on the display area AA of the display panel 120. That is, even with gravity applied to the second top cover 651b, the second top cover 651b may not be rotated by the connection member 654, and, thus, the second top cover 651b may be disposed on the display area AA of the display panel 120.

Thereafter, referring to FIG. 7G and FIG. 7H, as the display panel 120 is wound by rotating the roller 161 in the second direction DR2, the display panel 120 and the first cover 110a may be wound on a top surface of the second top cover 651b. Thus, the display panel 120 may be stably wound while being rolled into an overall circular shape. Moreover, the second top cover 651b cooperates with the first top cover 651a to selectively provide a circular or cylindrical shape to the roller 161 to enable stable winding or rolling of the display panel 120 in a circular shape, which reduces the likelihood of damage to the display panel 120 and the display device 600, as shown in FIG. 7H. Once the second top cover 651b is disposed on the active area AA of the display panel 120, the continued rolling or winding of the roller 161 disposes the display panel 120 on top of the top surface of the second top cover 651b such that the display panel holds the second top cover 651b in position and prevents rotation of the second top cover 651b as the roller 161 continues to rotate, as demonstrated in FIG. 7H.

Then, the process in which the display panel 120 is unwound and the second top cover 651b exposes the display area AA will be described with reference to FIG. 7H through FIG. 7A. In general, the unwinding or unrolling process may be the reverse of the above winding or rolling operation.

Referring to FIG. 7F through FIG. 7H, as the display panel 120 is unwound by rotating the roller 161 in the first direction DR1, i.e., clockwise, the display panel 120 and the first cover 110a may get away from the top surface of the second top cover 651b. Put differently, as the display panel 120 and the first cover 110a are unwound, the display panel 120 and the first cover 110a are no longer disposed on the second top cover 651b to hold the second top cover 651b in place. Rather, the second top cover 651b becomes exposed to enable rotation of the second top cover 651b.

Then, referring to FIG. 7E and FIG. 7F, as the display panel 120 is unwound by rotating the roller 161 in the first direction DR1, the second top cover 651b may be rotated around the connection member 654 due to gravity as indicated by the arrow Since the second top cover 651b is rotated due to gravity, the second top cover 651b may be disposed in the direction perpendicular to the ground surface. In other words, the second top cover 651b begins to rotate as the flat part 161F of the roller 161 begins to face the ground surface and continues to rotate while the flat part 161F of the roller 161 moves to and past perpendicular to the ground surface.

Thereafter, referring to FIG. 7B through FIG. 7E, as the display panel 120 is unwound by rotating the roller 161 in the first direction DR1, the second top cover 651b may be rotated around the connection member 654 due to gravity as indicated by the arrows Ⓑ, Ⓒ and Ⓓ. Since the second top cover 651b is rotated due to gravity, the second top cover 651b may be rotated while being disposed in the direction perpendicular to the ground surface until it may be rotated to the maximum amount enabled by the connection member 654. Thus, as shown in FIG. 7B, the second top cover 651b may be rotated and disposed to expose the display area AA.

Then, referring to FIG. 7A and FIG. 7B, as the display panel 120 is unwound by rotating the roller 161 in the first direction DR1, the cover part 650 may get away from the roller 161. Also, the second top cover 651b may still expose the display area AA. In other words, as the display panel 120 approaches the fully unwound position shown in FIG. 7A, the cover part 650 is no longer disposed on the flat part 161F of the roller 161, but rather, is spaced from the roller 161. In this position, the second top cover 651b returns to its original position rotated 180 degrees relative to the first top cover 651a with the second top cover 651b positioned adjacent to, and side-by-side with, the first top cover 651a. In this position, the second top cover 651b rotates to no longer be disposed on the active area AA of the display panel 120 to prevent the second top cover 651b from blocking the image in the active area AA of the display panel.

In the display device 600 according to another embodiment of the present disclosure, the second top cover 651b that may be rotated by the first connection member 654 is used to selectively expose the display area AA of the display panel 120. Also, the second top cover 651b is used to maintain a circular shape of the roller 161 and the cover part 650. First, while the display panel 120 is wound on the roller 161, the second top cover 651b may be rotated by the connection member 654 due to gravity of the second top cover 651b without a separate driving power. Also, the second top cover 651b may be disposed on the flat part 161F of the roller 161. Thus, the cover part 650 and the roller 161 may form a circular shape, and in a continuous winding operation, the display panel 120 may be stably wound on the cover part 650 and the roller 161 that form a circular shape. Also, while the display panel 120 is unwound from the roller 161, the second top cover 651b may be rotated by the connection member 654 due to gravity of the second top cover 651b without a separate driving power. Also, the second top cover 651b may expose the display area AA of the display panel 120. Therefore, in the display device 600 according to another embodiment of the present disclosure, the second top cover 651b may be selectively disposed on the display area AA of the display panel 120 or may form a circular shape with the roller 161. Thus, a portion of the display panel 120 disposed on a flat top surface of the cover part 650 may increase in size. Accordingly, stress applied to the display panel 120 may be minimized, and at the same time, winding and unwinding operations may be stably performed.

Groove of Second Top Cover

Figure 8:
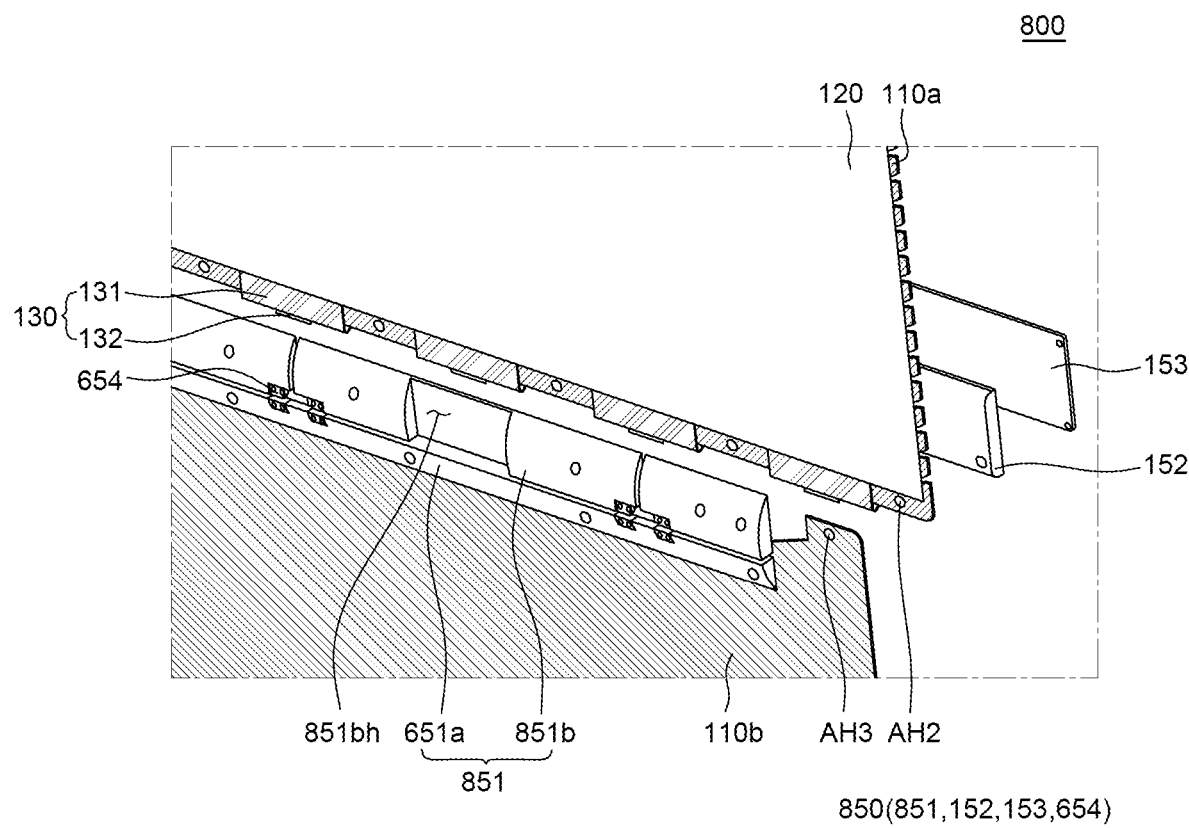
FIG. 8 is an exploded perspective view of a display device according to yet another embodiment of the present disclosure.

FIG. 8 is an exploded perspective view of a display device according to yet another embodiment of the present disclosure. A display device 800 shown in FIG. 8 has substantially the same configuration as the display device 600 shown in FIG. 6A through FIG. 7H except a second top cover 851b of a top cover 851 of a cover part 850. Thus, a repeated description will be omitted.

Referring to FIG. 8, the cover part 850 of the display device 800 according to yet another embodiment of the present disclosure includes the top cover 851, the bottom cover 152, the base plate 153 and the connection member 654. Here, the top cover 851 includes the first top cover 651a and a second top cover 851b.

A plurality of grooves 851bh is disposed in a top surface of the second top cover 851b. Although FIG. 8 illustrates one groove 851bh disposed in the top surface of the second top cover 851b, the present disclosure is not limited thereto and there may be more than one groove 851bh, such as one, two, three, four, five, six, seven, eight, nine, ten or more grooves 851bh. A plurality of grooves 851bh may be disposed in the top surface of the second top cover 851b. The plurality of grooves 851bh may be formed by removing concave portions of the second top cover 851b from the top surface of the second top cover 851b.

In the display device 800 according to yet another embodiment of the present disclosure, the plurality of grooves 851bh is disposed in the top surface of the second top cover 851b. Thus, it is possible to suppress opening of the second top cover 851b at unnecessary positions when the display panel 120 is unwound. If the center of gravity of the second top cover 851b is located close to the top surface of the second top cover 851b when the display panel 120 is unwound, the second top cover 851b may be opened at unnecessary positions. Particularly, an auxiliary roller configured to apply a predetermined elastic force to the display panel 120 and assist in winding and unwinding of the display panel 120 may be applied to the display device 800. In this case, a part of the display panel 120 may be inclined by the auxiliary roller between the auxiliary roller and the roller 161. Also, when the second top cover 851b passes through the inclined portion, it may be unnecessarily opened and closed. When the second top cover 851b is opened at an unnecessary position as described above, the second top cover 851b may be closed again due to gravity. In this process, unnecessary noise may be generated. Thus, in the display device 800 according to yet another embodiment of the present disclosure, the plurality of grooves 851bh is disposed in the top surface of the second top cover 851b. Therefore, the weight of a top portion of the second top cover 851b may be reduced. Accordingly, the center of gravity of the second top cover 851b may move to a bottom side of the second top cover 851b. As the center of gravity of the second top cover 851b moves to the bottom side of the second top cover 851b, it becomes easier to maintain a closed state of the second top cover 851b. Therefore, in the display device 800 according to yet another embodiment of the present disclosure, it is possible to suppress unnecessary opening and closing while the display panel 120 is unwound. Also, it is possible to minimize the generation of noise while the display panel 120 is wound.

First Portion and Second Portion of Second Top Cover

Figure 9:
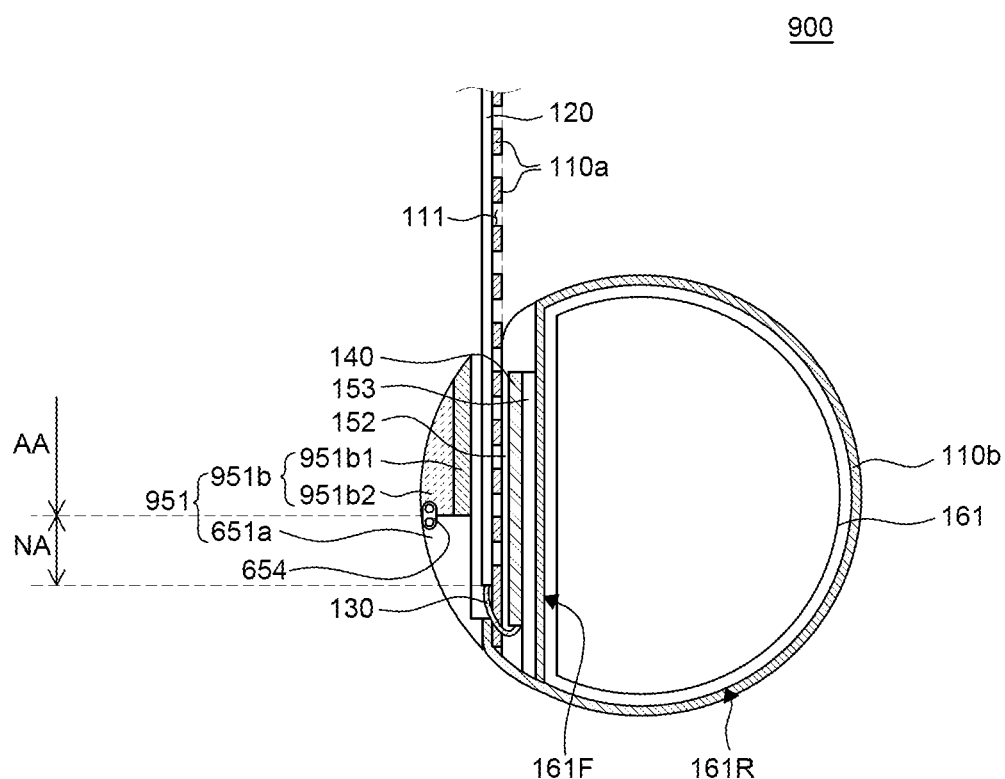
FIG. 9 is a cross-sectional view of a display device according to still another embodiment of the present disclosure.

FIG. 9 is a cross-sectional view of a display device according to still another embodiment of the present disclosure. A display device 900 shown in FIG. 9 has substantially the same configuration as the display device 600 shown in FIG. 6A through FIG. 7H except a second top cover 951b of a top cover 951 of a cover part 950. Thus, a repeated description will be omitted.

Referring to FIG. 9, the cover part 950 of the display device 900 according to still another embodiment of the present disclosure includes the top cover 951, the bottom cover 152, the base plate 153 and the connection member 654. Here, the top cover 951 includes the first top cover 651a and the second top cover 951b.

The second top cover 951b includes a first portion 951b1 and a second portion 951b2.

The first portion 951b1 may be heavier than the second portion 951b2. For example, the first portion 951b1 may be made of a material such as Steel Use Stainless (SUS), but is not limited thereto.

A top surface and a bottom or rear surface of the first portion 951b1 may be flat and a side surface of the first portion 951b1 may be round. Thus, the side surface of the first portion 951b1 may form a circular shape with the curved part 161R of the roller 161.

The second portion 951b2 may be disposed on the first portion 951b1. That is, as shown in FIG. 9, the second portion 951b2 may be disposed on the first portion 951b1 in a state where the cover part 950 is mounted on the roller 161. Thus, the second portion 951b2 may be disposed farther from the roller 161 than the first portion 951b1. In some embodiments, the first portion 951b1 is a first layer of the second top cover 951b and the second portion 951b2 is a second layer of the second top cover 951b on the first portion 951b1 with the first portion 951b1 structured to face the flat part 161F of the roller 161 and the second portion 951b2 structured to face away from the flat part 161F of the roller 161.

The second portion 951b2 may be lighter than the first portion 951b1. For example, the second portion 951b2 may be made of aluminum (Al) or polycarbonate (PC), but is not limited thereto. However, a top surface of the second portion 951b2 needs to have a round shape. Therefore, the second portion 951b2 may be made of polycarbonate (PC) in view of easiness in manufacturing of the second portion 951b2. Also, it may be advantageous for the second portion 951b2 to be made of polycarbonate (PC) in view of noise.

A bottom surface of the second portion 951b2 may be flat and the top surface of the second portion 951b2 may be round. Thus, the top surface of the second portion 951b2 may form a circular shape with the side surface of the first portion 951b1 and the curved part 161R of the roller 161.

In the display device 900 according to still another embodiment of the present disclosure, the second top cover 951b includes the first portion 951b1 and the second portion 951b2. Thus, it is possible to suppress opening of the second top cover 951b at unnecessary positions when the display panel 120 is unwound. If the center of gravity of the second top cover 951b is located close to the top surface of the second top cover 951b when the display panel 120 is unwound, the second top cover 951b may be opened at unnecessary positions. When the second top cover 951b is opened at an unnecessary position as described above, the second top cover 951b may be closed again due to gravity. In this process, unnecessary noise may be generated. Thus, in the display device 900 according to still another embodiment of the present disclosure, the second portion 951b2 that is lighter than the first portion 951b1 is disposed on the first portion 951b1. Therefore, the weight of a top portion of the second top cover 951b may be reduced. Accordingly, the center of gravity of the second top cover 951b may move to a bottom side of the second top cover 951b. For example, the center of gravity of the second top cover 951b is located at the first portion 951b1. Thus, it becomes easier to maintain a closed state of the second top cover 951b. Therefore, in the display device 900 according to still another embodiment of the present disclosure, it is possible to suppress unnecessary opening and closing while the display panel 120 is unwound. Also, it is possible to minimize the generation of noise while the display panel 120 is wound.

Figure 10:
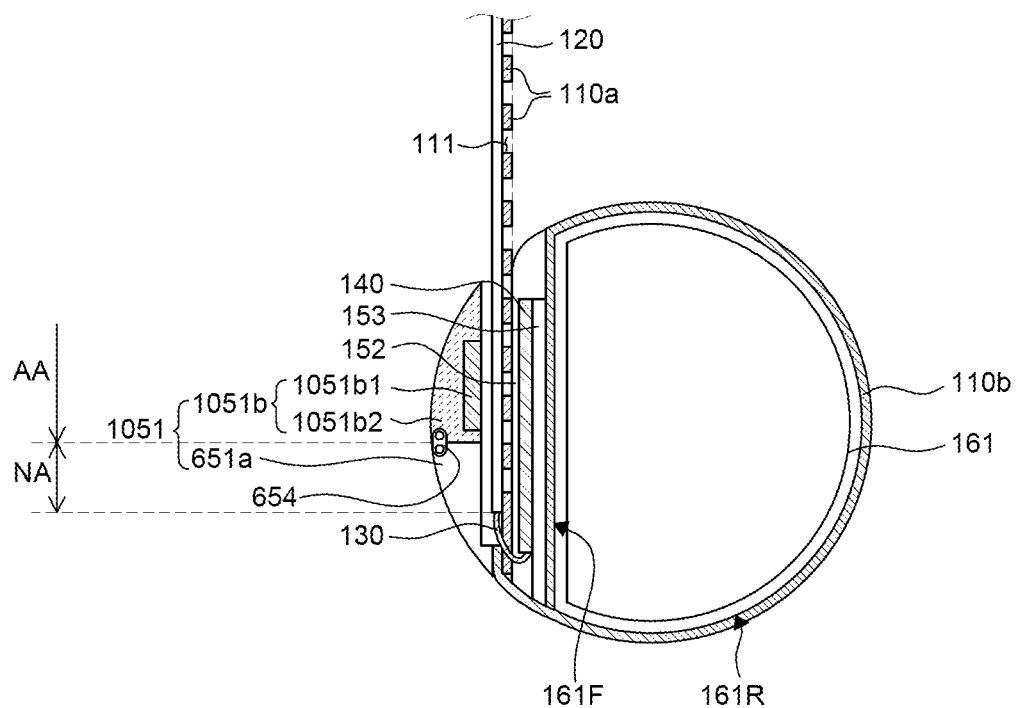
FIG. 10 is a cross-sectional view of a display device according to still another embodiment of the present disclosure.

FIG. 10 is a cross-sectional view of a display device according to still another embodiment of the present disclosure. A display device 1000 shown in FIG. 10 has substantially the same configuration as the display device 900 shown in FIG. 9 except a second top cover 1051b of a top cover 1051 of a cover part 1050. Thus, a repeated description will be omitted.

Figure 11:
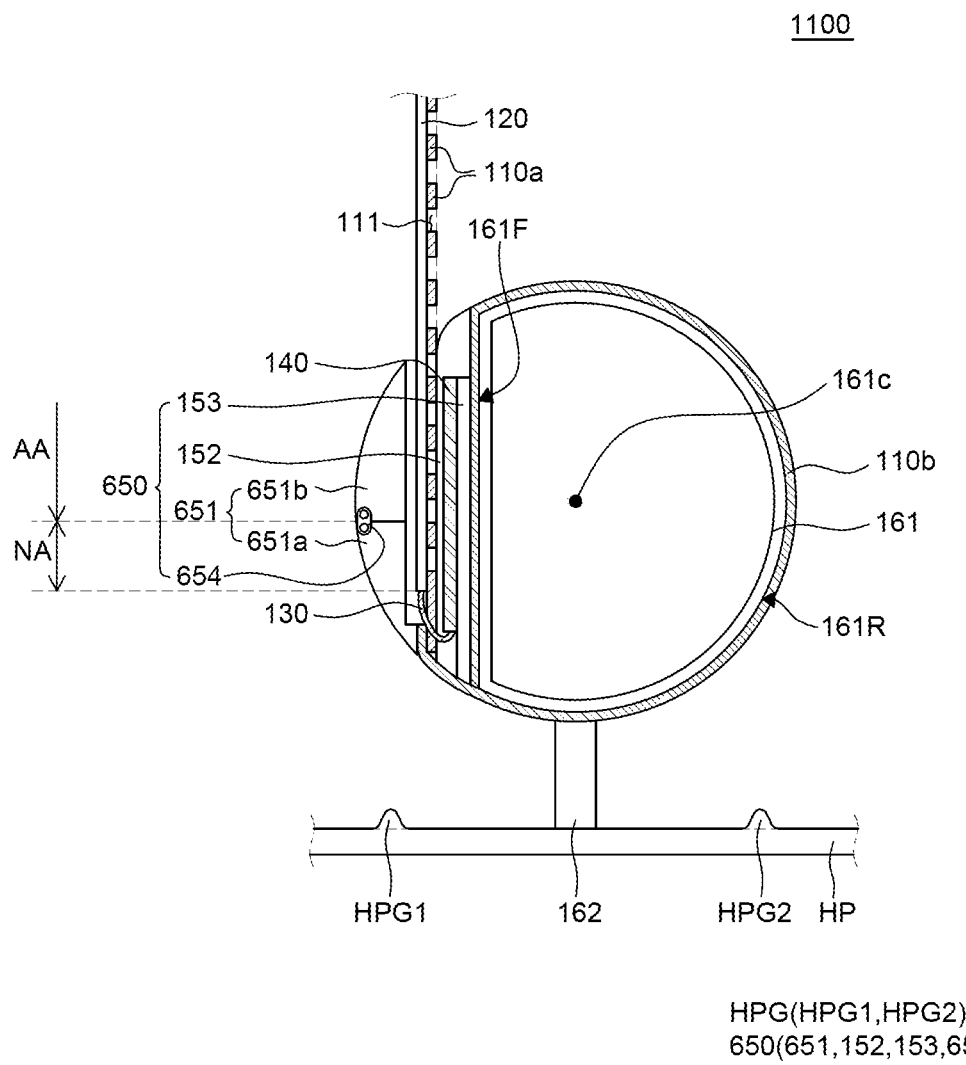
FIG. 11 is a cross-sectional view of a display device according to still another embodiment of the present disclosure.

Referring to FIG. 10, the cover part 1050 of the display device 1000 according to still another embodiment of the present disclosure includes the top cover 1051, the bottom cover 152, the base plate 153 and the connection member 654. Here, the top cover 1051 includes a first top cover 1051a and the second top cover 1051b. Also, the second top cover 1051b includes a first portion 1051b1 and a second portion 1051b2. The first portion 1051b1 and the second portion 1051b2 shown in FIG. 11 are the same as the first portion 951b1 and the second portion 951b2 shown in FIG. 9 except the shape thereof. Thus, a description of common properties between the first portion 1051b1 and the second portion 1051b2 shown in FIG. 11 and the first portion 951b1 and the second portion 951b2 shown in FIG. 9 will be omitted.

Referring to FIG. 10, the first portion 1051b1 may have a cuboid shape. That is, a top surface, a side surface and a bottom surface of the first portion 1051b1 may be all flat surfaces.

The second portion 1051b2 may cover the side surface and the top surface of the first portion 1051b1. Here, a top surface of the second portion 1051b2 may have a round shape, and, thus, the second portion 1051b2 may form a circular shape with the curved part 161R of the roller 161.

In the display device 1000 according to still another embodiment of the present disclosure, the second top cover 1051b including the first portion 1051b1 having a cuboid shape and the second portion 1051b2 has a shape that covers the side surface and the top surface of the first portion 1051b1. Thus, it may become easier to manufacture the second top cover 1051b. When a structure is manufactured, it may be easier to manufacture a structure, such as a cuboid, having flat surfaces than a structure having curved surfaces. Thus, in the display device 1000 according to still another embodiment of the present disclosure, the top surface of the second top cover 1051b has a round shape. Therefore, it may be more difficult to manufacture the second top cover 1051b than a top cover having a flat top surface. Thus, in the display device 1000 according to still another embodiment of the present disclosure, the first portion 1051b1 of the second top cover 1051b may be more easily formed into a cuboid shape. Only the second portion 1051b2 of the second top cover 1051b may be formed to have a curved top surface. Therefore, the second top cover 1051b may be manufactured more easily. The second portion 1051b2 may completely surround the first portion 1051b1 in some embodiments, or the first portion 1051b1 may extend to side surfaces of the first portion 1051b1 with the second portion 1051b2 surrounding the remaining surfaces of the first portion 1051b1.

Also, in the display device 1000 according to still another embodiment of the present disclosure, the second portion 1051b2 that is lighter than the first portion 1051b1 is disposed on the first portion 1051b1. Therefore, the weight of a top portion of the second top cover 1051b may be reduced. Accordingly, the center of gravity of the second top cover 1051b may move to a bottom side of the second top cover 1051b. For example, the center of gravity of the second top cover 1051b is located at the first portion 1051b1. Thus, it may become easier to maintain a closed state of the second top cover 1051b. Therefore, in the display device 1000 according to still another embodiment of the present disclosure, it is possible to suppress unnecessary opening and closing while the display panel 120 is unwound. Also, it is possible to minimize the generation of noise while the display panel 120 is wound.

Guide Unit of Housing Part

FIG. 11 is a cross-sectional view of a display device according to still another embodiment of the present disclosure. FIG. 12A through FIG. 12D are cross-sectional views for explaining a winding operation of the display device according to still another embodiment of the present disclosure. FIG. 13A through FIG. 13E are cross-sectional views for explaining an unwinding operation of the display device according to still another embodiment of the present disclosure. A display device 1100 shown in FIG. 11 through FIG. 13E has substantially the same configuration as the display device 600 shown in FIG. 6A through FIG. 7H except a housing part HP. Thus, a repeated description will be omitted.

Referring to FIG. 11, the housing part HP may include a guide unit HPG (which may also be referred to herein as a guide HPG) protruding from a bottom surface of the housing part HP. The guide unit HPG may guide a rotation of the second top cover 651b.

The guide unit HPG may include a first guide unit HPG1 (which may also be referred to herein as a first guide HPG1) located on one side of a center 161c of the roller 161 and a second guide unit HPG2 (which may also be referred to herein as a second guide HPG2) located on the other side of the center 161c of the roller 161. Thus, the first guide unit HPG1 is opposite to the second guide unit HPG2 relative to the the center 161c of the roller 161.

The guide unit HPG may have an inclined shape. That is, a top surface or a side surface of the first guide unit HPG1 and the second guide unit HPG2 may have an inclined shape. For example, a cross-sectional shape of the first guide unit HPG1 and the second guide unit HPG2 may be a triangular shape, a semi-circular shape, a trapezoid shape, and the like, but is not limited thereto. Also, the first guide unit HPG1 and the second guide unit HPG2 may have the same cross-sectional shape or different cross-sectional shapes.

Hereinafter, the guide unit HPG of the housing part HP of the display device 1100 according to still another embodiment of the present disclosure will be described in more detail with reference to FIG. 12A through FIG. 13E as well.

FIG. 12A through FIG. 12D are cross-sectional views for explaining a winding operation of the display device according to still another embodiment of the present disclosure. That is, FIG. 12A through FIG. 12D illustrate a process in which the second top cover 651b is guided by the guide unit HPG of the housing part HP when the display panel 120 is wound in a time sequential manner.

Figure 12A:
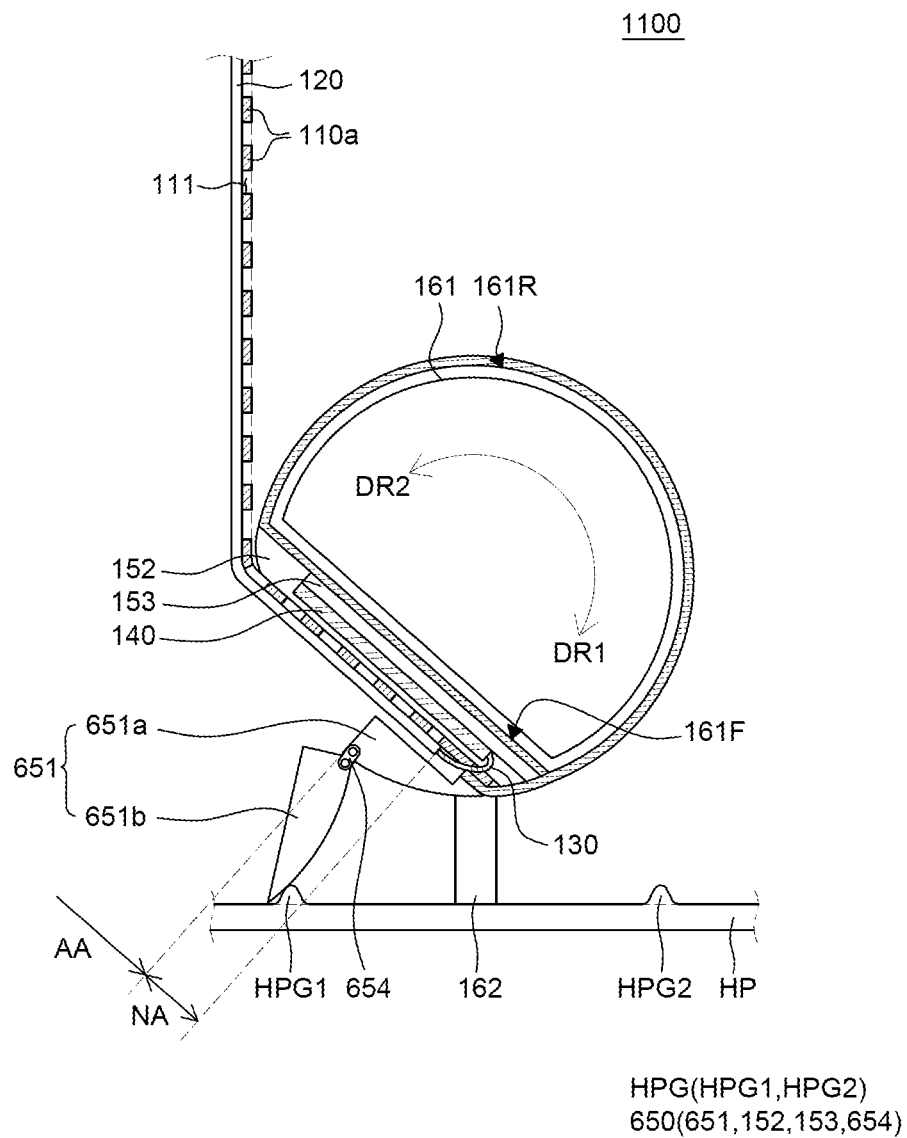
FIG. 12A through FIG. 12D are cross-sectional views illustrating steps in a winding operation of the display device according to still another embodiment of the present disclosure.
Figure 12B:
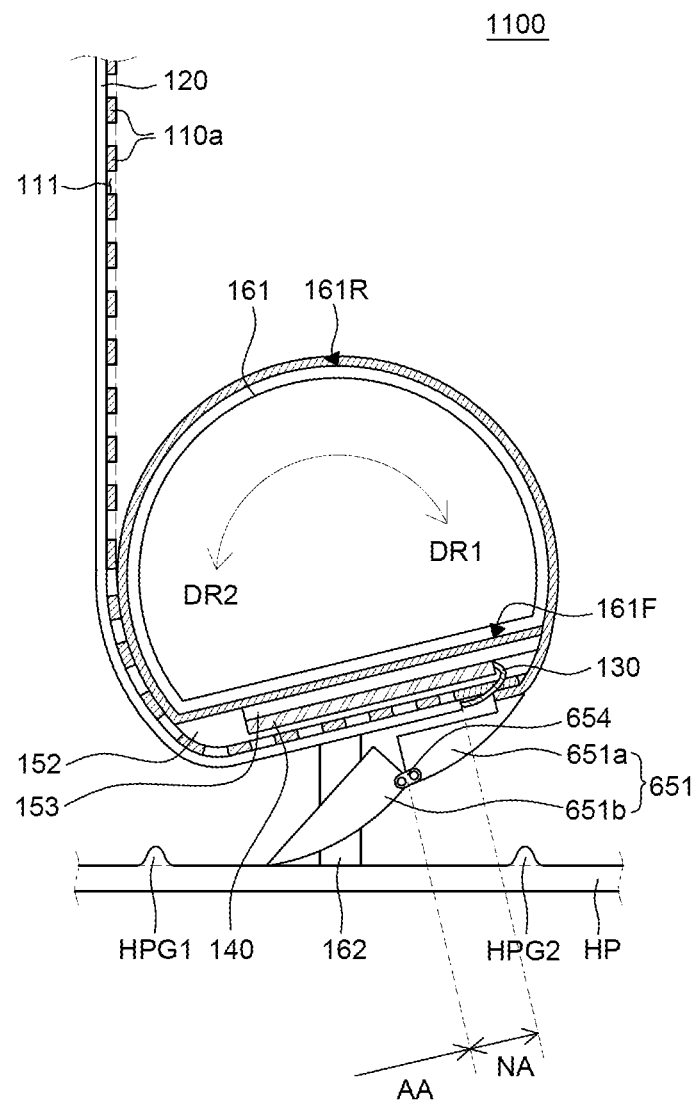

First, referring to FIG. 12A and FIG. 12B, as the display panel 120 is wound by rotating the roller 161 in the second direction DR2, i.e., counterclockwise, the second top cover 651b may be brought into contact with the first guide unit HPG1. Also, the first guide unit HPG1 may primarily increase the degree of rotation of the second top cover 651b to increase the degree of closeness of the second top cover 651b to the roller 161.

Figure 12C:
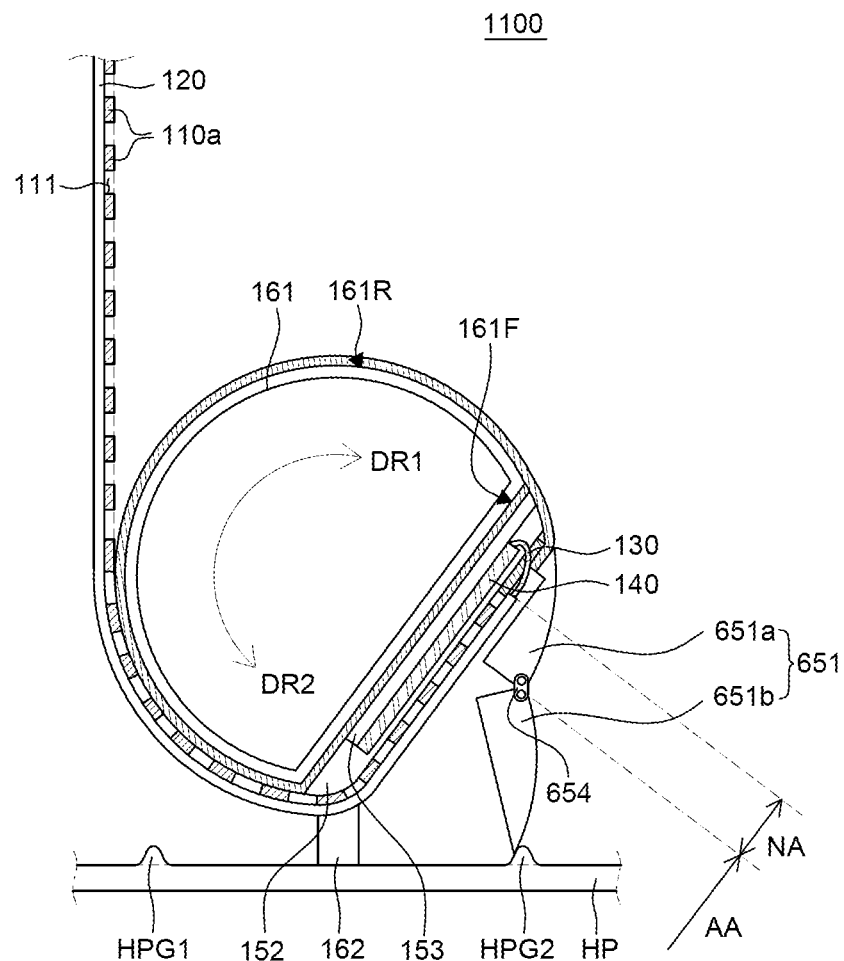

Then, referring to FIG. 12B and FIG. 12C, as the display panel 120 is wound by rotating the roller 161 in the second direction DR2, the second top cover 651b may be brought into contact with the second guide unit HPG2. Also, the second guide unit HPG2 may secondarily increase the degree of rotation of the second top cover 651b to further increase the degree of closeness of the second top cover 651b.

Figure 12D:
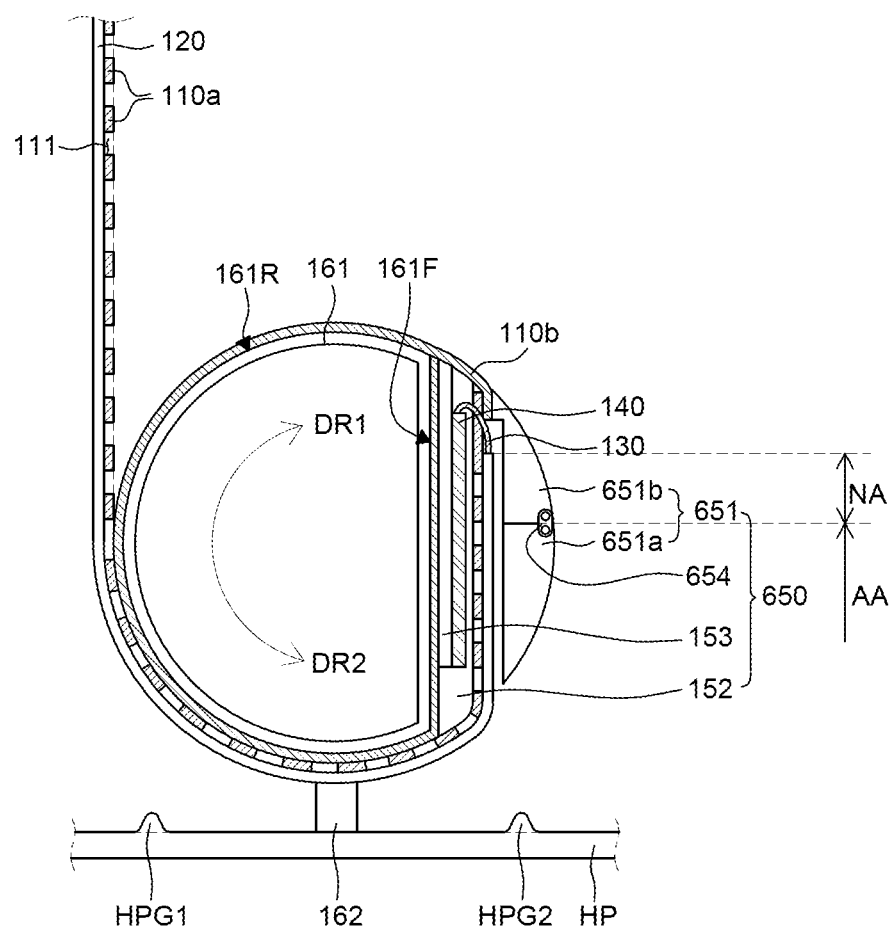

Thereafter, referring to FIG. 12C and FIG. 12D, as the display panel 120 is wound by rotating the roller 161 in the second direction DR2, the second top cover 651*b* may be stably rotated to be fully closed by the first guide unit HPG1 and the second guide unit HPG2. Thus, the guide unit HPG assists with rotating the second top cover 651*b* and assists with a full and complete rotation of the second top cover 651*b* towards the active area AA of the display panel 120 and the roller 161.

FIG. 13A through FIG. 13E are cross-sectional views for explaining an unwinding operation of the display device according to still another embodiment of the present disclosure. That is, FIG. 13A through FIG. 13E illustrate a process in which the second top cover 651*b* is guided by the guide unit HPG of the housing part HP when the display panel 120 is unwound in a time sequential manner.

Figure 13A:
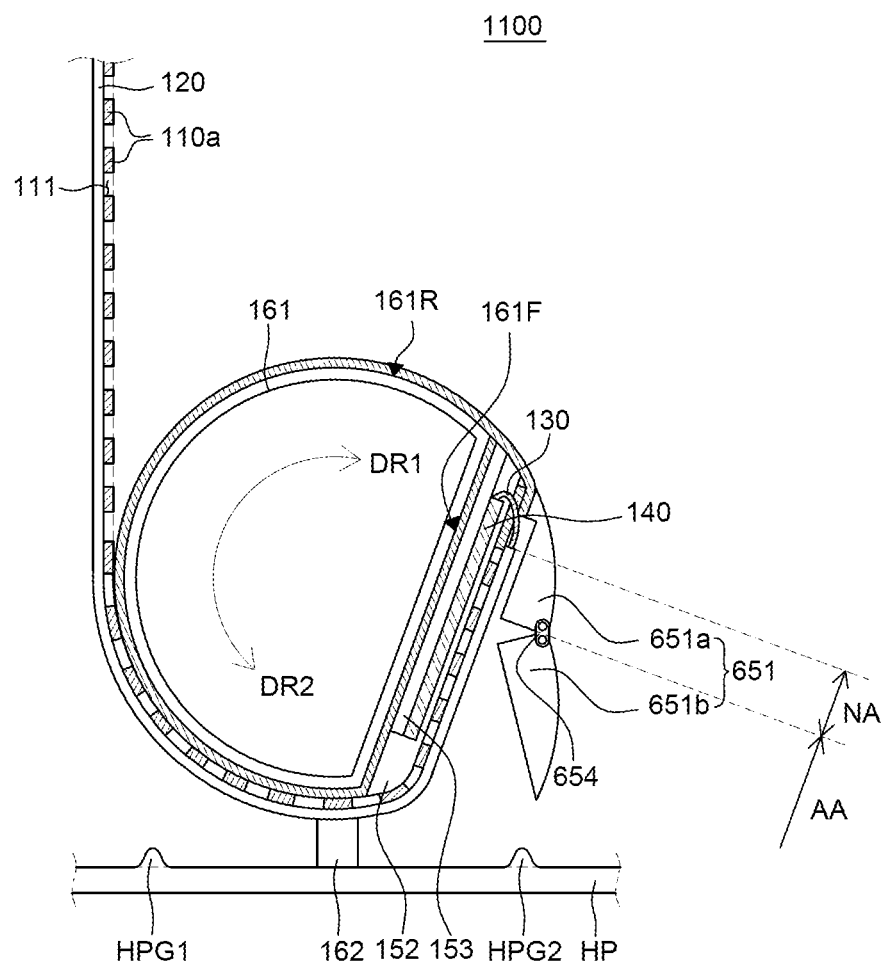
FIG. 13A through FIG. 13E are cross-sectional views illustrating an unwinding operation of the display device according to still another embodiment of the present disclosure.
Figure 13B:
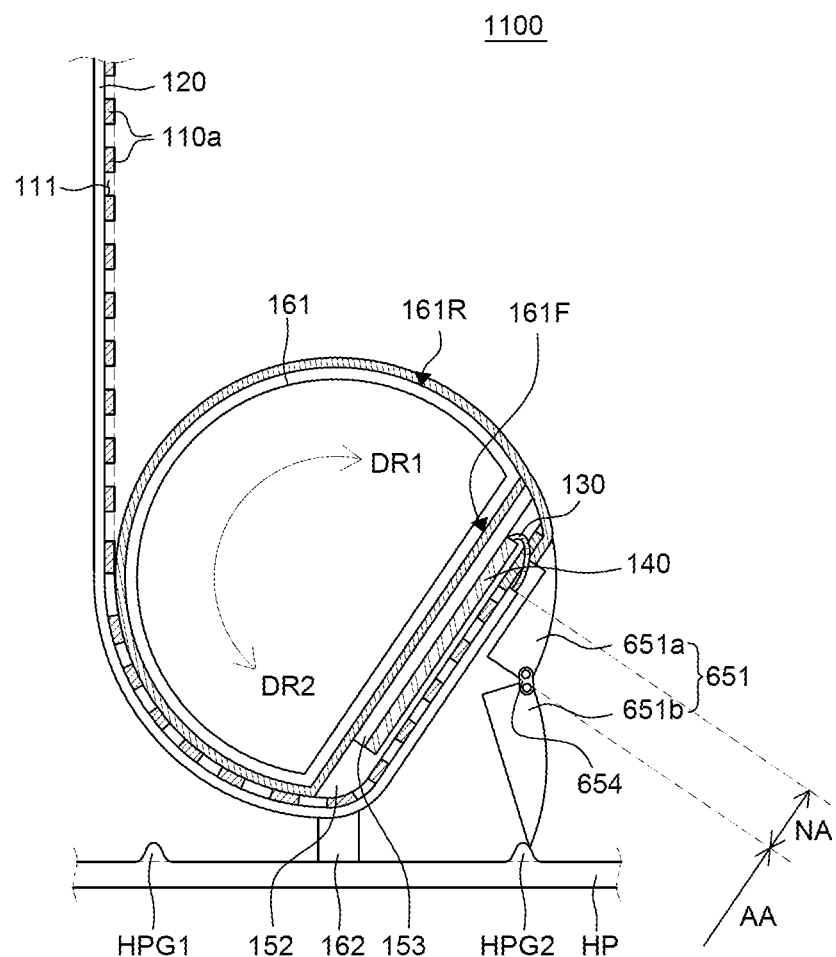

First, referring to FIG. 13A and FIG. 13B, as the display panel 120 is unwound by rotating the roller 161 in the first direction DR1, i.e., clockwise, the second top cover 651*b* may get away from the display area AA due to gravity. Also, the second top cover 651*b* may be brought into contact with the second guide unit HPG2.

Figure 13C:
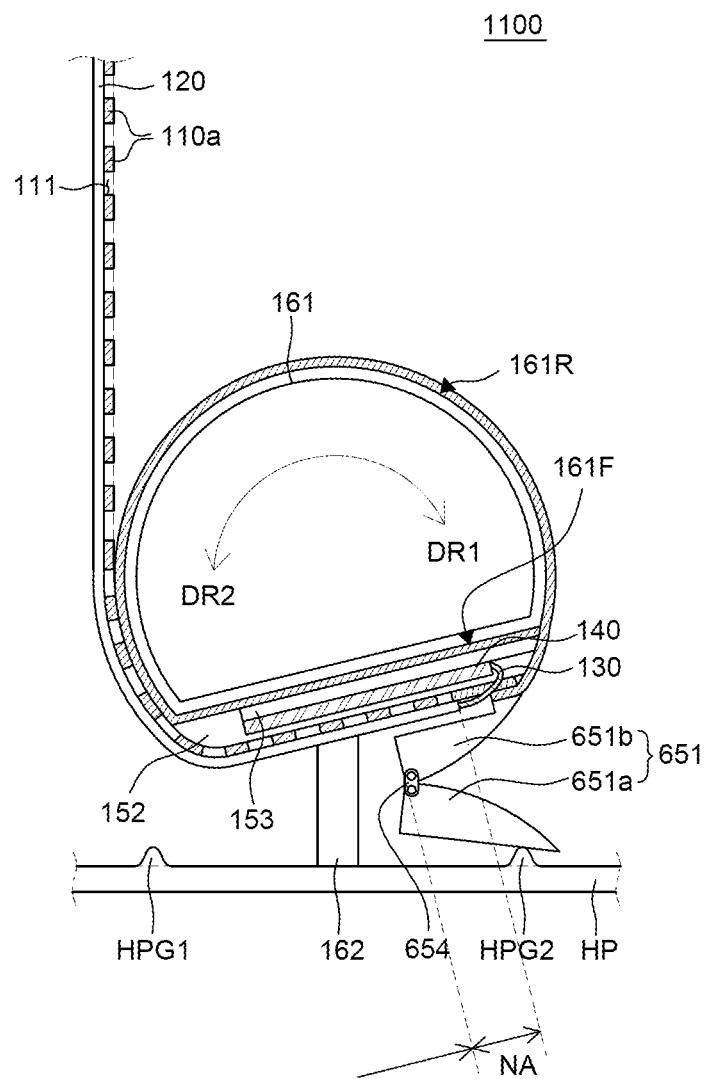

Then, referring to FIG. 13B and FIG. 13C, as the display panel 120 is unwound by rotating the roller 161 in the first direction DR1, the second guide unit HPG2 may primarily increase the degree of rotation of the second top cover 651*b* in contact with the second guide unit HPG2. Thus, it is possible to increase the degree of openness of the second top cover 651*b* relative to the display panel 120 and the roller 161.

Figure 13D:
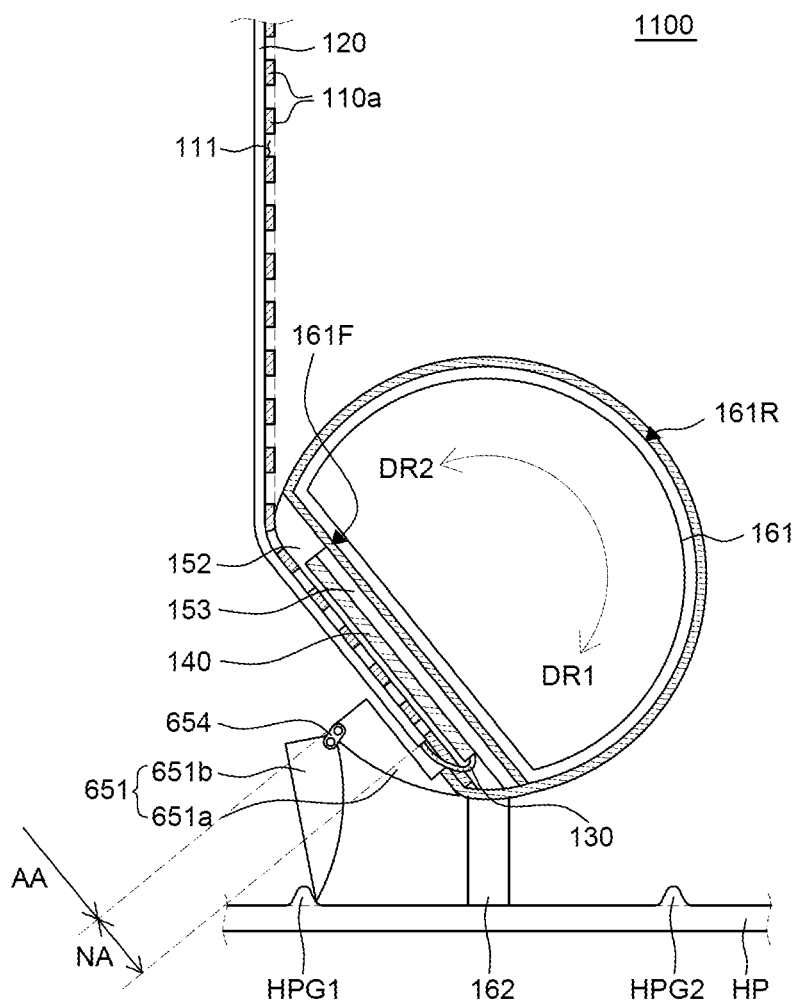

Thereafter, referring to FIG. 13C and FIG. 13D, as the display panel 120 is unwound by rotating the roller 161 in the first direction DR1, the second top cover 651*b* may be brought into contact with the first guide unit HPG1.

Figure 13E:
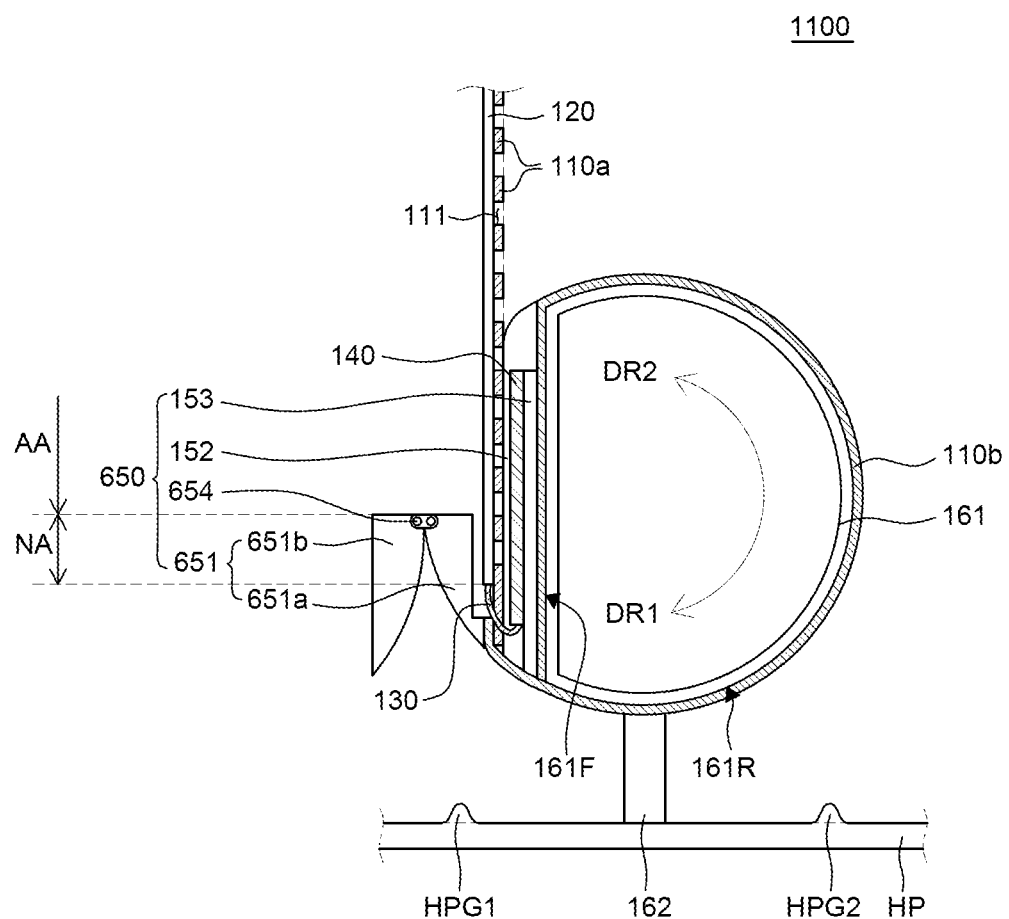

Then, referring to FIG. 13D and FIG. 13E, as the display panel 120 is unwound by rotating the roller 161 in the first direction DR1, the second guide unit HPG2 may secondarily increase the degree of rotation of the second top cover 651*b*. Thus, it is possible to further increase the degree of closeness of the second top cover 651*b*. Also, the second top cover 651*b* may be stably rotated to be fully opened by the first guide unit HPG1 and the second guide unit HPG2.

In the display device 1100 according to still another embodiment of the present disclosure, the guide unit HPG protruding from the bottom surface of the housing part HP is used. Thus, when the display panel 120 is wound or unwound, the guide unit HPG may stably open and close the second top cover 651*b*. Specifically, in the display device 1100 according to still another embodiment of the present disclosure, the guide unit HPG may be used to suppress exceptional opening of the second top cover 651*b* when the display panel 120 is wound. Also, the guide unit HPG may enable the second top cover 651*b* to maintain a circular shape with the curved part 161R of the roller 161. Further, in the display device 1100 according to still another embodiment of the present disclosure, the guide unit HPG may be used to suppress exceptional non-opening of the second top cover 651*b* when the display panel 120 is unwound. Also, the guide unit HPG may enable the display area AA to be easily exposed.

Also, in the display device 1100 according to still another embodiment of the present disclosure, the guide unit HPG has an inclined shape. Thus, the guide unit HPG may more easily guide a rotation of the second top cover 651*b*. For example, if the guide unit HPG may have a rectangular cross-sectional shape, the second top cover 651*b* having a pointed shape may cause the defects such as a dent between a side surface of the guide unit HPG and the bottom surface of the housing part HP. Therefore, in the display device 1100 according to still another embodiment of the present disclosure, the cross-sectional shape of the guide unit HPG is, for example, a triangular shape, a semi-circular shape and a trapezoid shape. Thus, the guide unit HPG may more easily guide a rotation of the second top cover 651*b*.

Pad of Cover Part

Figure 14:
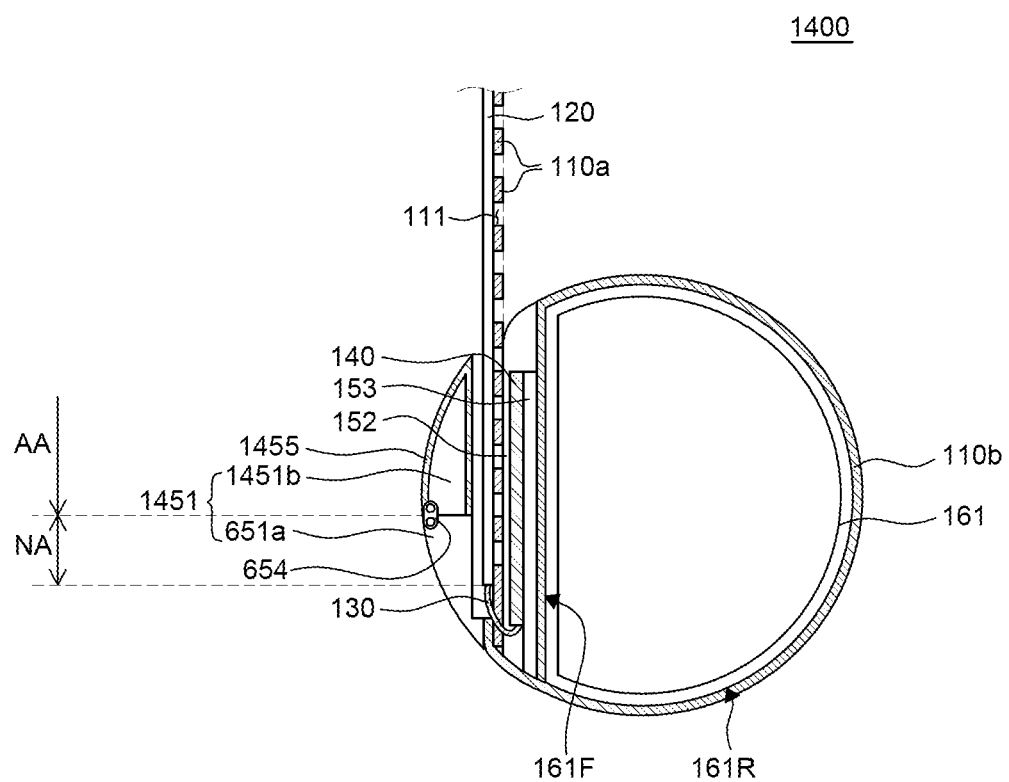
FIG. 14 is a cross-sectional view of a second top cover of a display device according to still another embodiment of the present disclosure.

FIG. 14 is a cross-sectional view of a second top cover of a display device according to still another embodiment of the present disclosure. A display device 1400 shown in FIG. 14 has substantially the same configuration as the display device 600 shown in FIG. 6A through FIG. 7H except a cover part 1450. Thus, a repeated description will be omitted.

Referring to FIG. 14, the cover part 1450 of the display device 1400 according to still another embodiment of the present disclosure includes a top cover 1451, the bottom cover 152, the base plate 153, the connection member 654 and a pad 1455.

The pad 1455 may be disposed to surround a surface of a second top cover 1451*b* and may therefore also be referred to as a layer 1455 or a cushion layer 1455 on the second top cover 1451*b*. For example, the pad 1455 is formed separately from the second top cover 1451*b* on the surface of the second top cover 1451*b* and may be disposed to surround the surface of the second top cover 1451*b*. Thus, the second top cover 1451*b* may be formed relatively small to form a curved shape corresponding to the curved part 161R of the roller 161 together with the pad 1455.

The pad 1455 may be made of a flexible material to absorb impacts that occur when the second top cover 1451*b* is in contact with the bottom surface of the housing part HP during winding and unwinding operations. For example, the pad 1455 may be made of a flexible material such as foam pad, silicon, etc., but is not limited thereto.

In the display device 1400 according to still another embodiment of the present disclosure, it is possible to absorb impacts applied to the second top cover 1451*b* during winding and unwinding operations by using the pad 1455 that surrounds the second top cover 1451*b*. Thus, in the display device 1400 according to still another embodiment of the present disclosure, it is possible to minimize noise generated when the second top cover 1451*b* is in contact with the bottom surface of the housing part HP during winding and unwinding operations.

Figure 15:
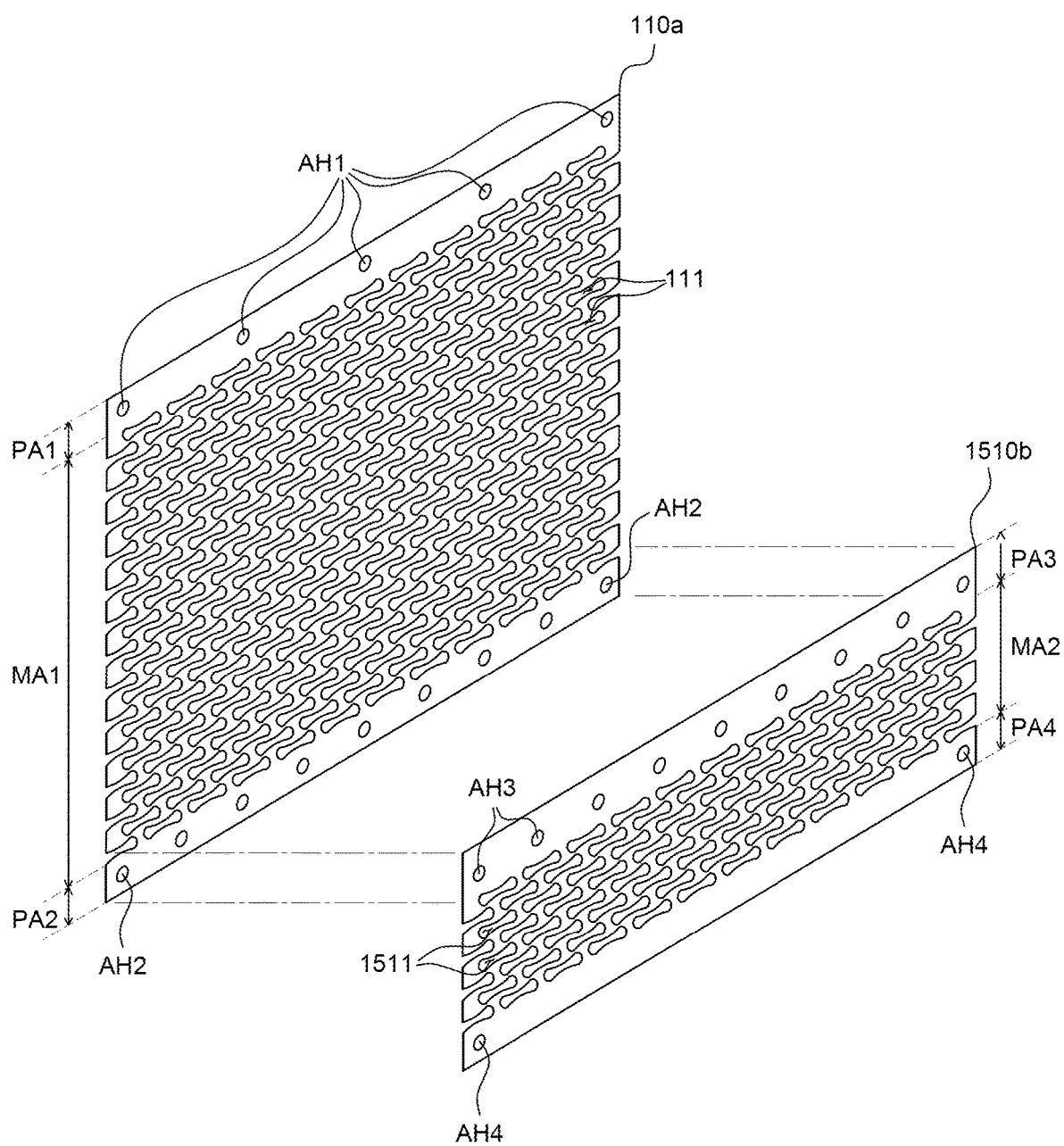
FIG. 15 is an exploded perspective view of a first cover and a second cover of a display device according to still another embodiment of the present disclosure.

FIG. 15 is an exploded perspective view for explaining a first cover and a second cover of a display device according to still another embodiment of the present disclosure. A second cover 1510*b* shown in FIG. 15 has substantially the same configuration as the second cover 110*b* shown in FIG. 1 through FIG. 6C except a partial change in shape. Thus, a repeated description will be omitted.

Referring to FIG. 15, the second cover 1510*b* according to still another embodiment of the present disclosure may include the malleable area MA and a plurality of support areas PA3 and PA4. The second cover 1510*b* may be made of a rigid material. Here, at least a portion of the second cover 1510*b* may be flexible to be wound or unwound along with the display panel 120. For example, the second cover 1510*b* may be made of a metallic material such as Steel Use Stainless (SUS) or Invar, or plastic, but is not limited thereto. The material of the second cover 1510*b* may vary depending on the design as long as it may satisfy property requirements such as the amount of thermal deformation, a radius of curvature, rigidity, and the like.

The second cover 1510b includes the malleable area MA and the plurality of support areas PA3 and PA4. The plurality of support areas PA3 and PA4 are areas in which a plurality of openings 1511 is not disposed, and the malleable area MA of the second cover 1510b is an area in which the plurality of openings 1511 is disposed. Specifically, the second cover 1510b includes the third support area PA3, the malleable area MA and the fourth support area PA4, and the third support area PA3, the malleable area MA and the fourth support area PA4 are disposed in sequence from the uppermost end of the second cover 1510b. Herein, the second cover 1510b is wound or unwound in the column direction, and, thus, the plurality of support areas PA3 and PA4 and the malleable area MA may be disposed along the column direction.

When the display part is wound or unwound, the plurality of openings 1511 disposed in the malleable area MA of the second cover 1510b may be deformed by stress which is applied to the display part. Specifically, when the display part is wound or unwound, the malleable area MA of the second cover 1510b may be deformed as the plurality of openings 1511 is contracted or expanded. Further, as the plurality of openings 1511 is contracted or expanded, a slip phenomenon of the display panel 120 disposed on the malleable area MA of the second cover 1510b is minimized. Thus, the stress applied to the display panel 120 may be minimized. As such, both the first and second covers 110a, 1510b include the plurality of openings 111, 1511 in some embodiments. The openings 111, 1511 may have the same shape and configuration or a different shape and configuration.

The embodiments of the present disclosure can also be described as follows.

According to an aspect of the present disclosure, a display device may include: a display panel including a display area where images are displayed; a first cover configured to support a rear surface of the display panel; a roller configured to wind or unwind the display panel and the first cover; a second cover whose one end is fixed to the roller and the other end is connected to one end of the first cover; and a cover part connecting the first cover and the second cover, wherein a boundary of the display area overlaps the cover part, and the cover part is configured to expose the display area.

The cover part may include a bottom cover and a top cover, and the display panel may be disposed between the bottom cover and the top cover, and the boundary of the display area may overlap the bottom cover, and the top cover may be located outside the display area.

The cover part may further include a base plate disposed on a rear surface of the bottom cover.

The top cover may include a first top cover; and a second top cover connected to the first top cover and disposed on the display area, and the cover part may further include a connection member that rotatably connects the second top cover to the first top cover.

The connection member may have a hinge structure.

The second top cover may be rotated to be disposed on the display area while the display panel is wound, and the second top cover may be rotated to expose the display area while the display panel is unwound.

A plurality of grooves may be disposed in a top surface of the second top cover.

The second top cover may include a first portion and a second portion on the first portion, and a weight of the first portion may be heavier than a weight of the second portion.

The first portion may be made of Steel Use Stainless (SUS), and the second portion is made of aluminum (Al) or polycarbonate (PC).

The second top cover may include a first portion and a second portion covering a side surface and a top surface of the first portion.

The cover part may further include a pad disposed to surround a surface of the second top cover.

The display device may further include: a housing part configured to accommodate the display panel, wherein the housing part may include: a bottom surface; and a guide unit that protrudes from the bottom surface so as to guide a rotation of the second top cover.

The guide unit may include a first guide unit located on one side based on a center of the roller and a second guide unit located on the other side based on the center of the roller.

The guide unit may have an inclined shape.

The display device may further include: an auxiliary roller configured to pressurize the display panel while the display panel is wound or unwound.

According to another aspect of the present disclosure, a display device may include: a display panel including a display area and a non-display area; a first cover attached to the display panel; a roller configured to wind or unwind the display panel; a second cover connecting the first cover and the roller; and a cover part which connects one end of the first cover and one end of the second cover and in which the non-display area is inserted, wherein a part of the display area is configured to be disposed on the cover part, and the cover part is configured to selectively expose the part of the display area configured to be disposed on the cover part.

The cover part may include a bottom cover and a top cover, and the part of the display area may be configured to be disposed on the bottom cover, and the top cover may be located outside the display area.

The top cover may include a first top cover and a second top cover, and the cover part may include a hinge structure that enables a rotation of the second top cover with respect to the first top cover, and the second top cover selectively exposes the part of the display area through the rotation by means of the hinge structure.

The second top cover may include a first portion and a second portion on the first portion, and the center of gravity of the second top cover may be located at the first portion.

The display device may further include: a housing part configured to accommodate the display panel, wherein the housing part may include a guide unit that guides a rotation of the second top cover.

According to another aspect of the present disclosure, a display device, may include a display panel including a display area; a first cover coupled to a rear surface of the display panel; a roller configured to wind or unwind the display panel and the first cover; a second cover having a first end coupled to the roller and a second end coupled to an end of the first cover; and a cover connection assembly coupled to the first cover and the second cover, wherein a boundary of the display area of the display panel overlaps the cover connection assembly and the cover connection assembly is configured to expose the display area of the display panel.

The cover connection assembly may include a bottom cover and a top cover with the display panel disposed between the bottom cover and the top cover of the cover connection assembly, and the boundary of the display area overlaps the bottom cover of the cover connection assembly with the top cover of the cover connection assembly is located outside the display area.

The cover connection assembly may further include a base plate disposed on a rear surface of the bottom cover of the cover connection assembly.

The top cover of the cover connection assembly may further include: a first top cover; and a second top cover coupled to the first top cover and disposed on the display area of the display panel, the cover connection assembly further including a connection member that rotatably couples the second top cover to the first top cover.

The connection member of the cover connection assembly may be a hinge.

The second top cover of the top cover may be structured to rotate to be disposed on the display area of the display panel in response to the display panel being wound around the roller, and the second top cover of the top cover is structured to rotate to expose the display area of the display panel in response to the display panel being unwound from the roller.

A top surface of the second top cover of the top cover may include a plurality of grooves.

The second top cover of the top cover may include a first portion and a second portion on the first portion, and a weight of the first portion is greater than a weight of the second portion.

The first portion of the second top cover may be Steel Use Stainless (SUS), and the second portion of the second top cover may be aluminum (Al) or polycarbonate (PC).

The second top cover of the top cover may include a first portion and a second portion, the second portion covering a side surface and a top surface of the first portion.

The cover connection assembly may further include a pad surrounding a surface of the second top cover of the top cover.

The display device may further include: a housing configured to accommodate the display panel, the housing including a bottom surface, and a guide extending from the bottom surface of the housing and structured to guide rotation of the second top cover of the top cover.

The guide may include a first guide located on a first side of the housing relative to a center of the roller and a second guide located on a second side of the housing opposite to the first side relative to the center of the roller.

The guide may have an inclined shape.

The display device may further include an auxiliary roller configured to apply pressure to the display panel while the display panel is wound or unwound around the roller.

According to another aspect of the present disclosure, a display device includes: a display panel including a display area and a non-display area; a first cover coupled to the display panel; a roller configured to wind or unwind the display panel; a second cover coupled to the first cover and to the roller; and a cover assembly coupled to an end of the first cover and to an end of the second cover, the non-display area of the display panel received in the cover assembly, wherein a portion of the display area of the display panel is configured to be disposed on the cover assembly, and the cover assembly is configured to selectively expose the portion of the display area of the display panel.

The cover assembly may include a bottom cover and a top cover, and the portion of the display area of the display panel is configured to be disposed on the bottom cover of the cover assembly, and the top cover of the cover assembly is located outside the display area of the display panel.

The top cover may include a first top cover and a second top cover, and the cover assembly includes a hinge structured to enable rotation of the second top cover of the top cover with respect to the first top cover of the top cover, and the second top cover of the top cover selectively exposes the portion of the display area of the display panel through rotation of the second top cover of the top cover via the hinge.

The second top cover of the top cover includes a first portion and a second portion on the first portion, and a center of gravity of the second top cover of the top cover is located at the first portion of the second top cover.

The display device may further include a housing configured to accommodate the display panel, wherein the housing includes a guide configured to guide a rotation of the second top cover of the top cover.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The invention claimed is:
1. A display device, comprising:
a display panel including a display area;
a first cover configured to support a rear surface of the display panel;
a roller configured to wind or unwind the display panel and the first cover;
a second cover having a first end coupled to the roller and a second end coupled to an end of the first cover; and
a cover connection assembly coupled to the first cover and the second cover,
wherein a boundary of the display area of the display panel overlaps the cover connection assembly and the cover connection assembly is configured to expose the display area of the display panel.

2. The display device according to claim 1, wherein the cover connection assembly includes a bottom cover and a top cover, and
the display panel is disposed between the bottom cover and the top cover of the cover connection assembly, and
the boundary of the display area overlaps the bottom cover of the cover connection assembly, and
the top cover of the cover connection assembly is located outside the display area.

3. The display device according to claim 2, wherein the cover connection assembly further includes a base plate disposed on a rear surface of the bottom cover of the cover connection assembly.

4. The display device according to claim 2, wherein the top cover of the cover connection assembly includes:
a first top cover; and
a second top cover coupled to the first top cover and disposed on the display area of the display panel, and
the cover connection assembly further includes a connection member that rotatably couples the second top cover to the first top cover.

5. The display device according to claim 4, wherein the connection member of the cover connection assembly is a hinge.

6. The display device according to claim 4, wherein the second top cover of the top cover is structured to rotate to be disposed on the display area of the display panel in response to the display panel being wound around the roller, and
the second top cover of the top cover is structured to rotate to expose the display area of the display panel in response to the display panel being unwound from the roller.

7. The display device according to claim 4, wherein a top surface of the second top cover of the top cover includes a plurality of grooves.

8. The display device according to claim 4, wherein the second top cover of the top cover includes a first portion and a second portion on the first portion, and
a weight of the first portion is greater than a weight of the second portion.

9. The display device according to claim 8, wherein the first portion of the second top cover is Steel Use Stainless (SUS), and
the second portion of the second top cover is aluminum (Al) or polycarbonate (PC).

10. The display device according to claim 4, wherein the second top cover of the top cover includes a first portion and a second portion, the second portion covering a side surface and a top surface of the first portion.

11. The display device according to claim 4, wherein the cover connection assembly further includes a pad surrounding a surface of the second top cover of the top cover.

12. The display device according to claim 4, further comprising:
a housing configured to accommodate the display panel, the housing including:
a bottom surface; and
a guide extending from the bottom surface of the housing and structured to guide rotation of the second top cover of the top cover.

13. The display device according to claim 12, wherein the guide includes a first guide located on a first side of the housing relative to a center of the roller and a second guide located on a second side of the housing opposite to the first side relative to the center of the roller.

14. The display device according to claim 12, wherein the guide has an inclined shape.

15. The display device according to claim 1, further comprising:
an auxiliary roller configured to apply pressure to the display panel while the display panel is wound or unwound around the roller.

16. A display device, comprising:
a display panel including a display area and a non-display area;
a first cover coupled to the display panel;
a roller configured to wind or unwind the display panel;
a second cover coupled to the first cover and to the roller; and
a cover assembly coupled to an end of the first cover and to an end of the second cover, the non-display area of the display panel received in the cover assembly,
wherein a portion of the display area of the display panel is configured to be disposed on the cover assembly, and
the cover assembly is configured to selectively expose the portion of the display area of the display panel.

17. The display device according to claim 16, wherein the cover assembly includes a bottom cover and a top cover, and
the portion of the display area of the display panel is configured to be disposed on the bottom cover of the cover assembly, and
the top cover of the cover assembly is located outside the display area of the display panel.

18. The display device according to claim 17, wherein the top cover includes a first top cover and a second top cover, and
the cover assembly includes a hinge structured to enable rotation of the second top cover of the top cover with respect to the first top cover of the top cover, and
the second top cover of the top cover selectively exposes the portion of the display area of the display panel through rotation of the second top cover of the top cover via the hinge.

19. The display device according to claim 18, wherein the second top cover of the top cover includes a first portion and a second portion on the first portion, and
a center of gravity of the second top cover of the top cover is located at the first portion of the second top cover.

20. The display device according to claim 18, further comprising:
a housing configured to accommodate the display panel,
wherein the housing includes a guide configured to guide a rotation of the second top cover of the top cover.

* * * * *